United States Patent
Gleason et al.

(10) Patent No.: US 9,598,598 B2
(45) Date of Patent: Mar. 21, 2017

(54) DEVELOPMENT OF ZWITTERIONIC COATINGS THAT CONFER ULTRA ANTI-BIOFOULING PROPERTIES TO COMMERCIAL REVERSE OSMOSIS MEMBRANES

(71) Applicants: Massachusetts Institute of Technology, Cambridge, MA (US); King Fahd University of Petroleum & Minerals, Dhahran (SA)

(72) Inventors: Karen K. Gleason, Cambridge, MA (US); Zafarullah Khan, Tewksbury, MA (US); Hafiz Zahid Shafi, Lahore (PK); Rong Yang, Cambridge, MA (US)

(73) Assignees: Massachusetts Institute of Technology, Cambridge, MA (US); King Fahd University of Petroleum and MInerals, Dharan (SA)

( * ) Notice: Subject to any disclaimer, the term of this patent is extended or adjusted under 35 U.S.C. 154(b) by 112 days.

(21) Appl. No.: 14/324,656

(22) Filed: Jul. 7, 2014

(65) Prior Publication Data

US 2016/0002489 A1  Jan. 7, 2016

(51) Int. Cl.
*B01D 61/00* (2006.01)
*B01D 63/00* (2006.01)
(Continued)

(52) U.S. Cl.
CPC .......... *C09D 139/08* (2013.01); *B01D 65/08* (2013.01); *B01D 67/0088* (2013.01); *B05D 3/142* (2013.01); *C08F 222/1006* (2013.01); *C08F 226/10* (2013.01); *C09D 5/1637* (2013.01); *B01D 2321/28* (2013.01)

(58) Field of Classification Search
CPC .... C08F 220/56; C08F 222/1006; C08F 2/00; B01D 2321/28; B01D 65/08; B01D 67/0088; B01D 71/12; C09D 5/16; C02F 1/04; C02F 1/44
See application file for complete search history.

(56) References Cited

U.S. PATENT DOCUMENTS 4,477,634 A * 10/1984 Linder ............... B01D 67/0093
                                                        210/500.28
5,164,424 A * 11/1992 Brueschke ......... B01D 67/0093
                                                              210/640
(Continued)

FOREIGN PATENT DOCUMENTS

EP  0 201 214 A2  11/1986
EP  0 682 978 A1  11/1995
(Continued)

OTHER PUBLICATIONS

Yang et al., "Surface-Tethered Zwitterionic Ultrathin Antifouling Coatings on Reverse Osmosis Membranes by Initiated Chemical Vapor Deposition," Chemistry of Materials, 23(5):1263-1272 (2011).

(Continued)

*Primary Examiner* — Ana Fortuna
(74) *Attorney, Agent, or Firm* — Dana M. Gordon; Foley Hoag LLP

(57) ABSTRACT

Disclosed are methods of preparing antifouling coatings on reverse osmosis membranes with initiated chemical vapor deposition. The coatings enhance the stability and lifetime of membranes without sacrificing performance characteristics, such as permeability or salt retention.

20 Claims, 14 Drawing Sheets

(51) Int. Cl.
*B01D 39/00* (2006.01)
*B01D 67/00* (2006.01)
*B29C 44/04* (2006.01)
*C09D 139/08* (2006.01)
*B05D 3/14* (2006.01)
*B01D 65/08* (2006.01)
*C09D 5/16* (2006.01)
*C08F 222/10* (2006.01)
*C08F 226/10* (2006.01)

(56) References Cited

U.S. PATENT DOCUMENTS

| | | | |
|---|---|---|---|
| 5,264,125 A | 11/1993 | MacDonald et al. | |
| 2005/0242032 A1* | 11/2005 | Sugito | C02F 1/04 |
| | | | 210/641 |
| 2010/0080841 A1* | 4/2010 | Porbeni | A61L 27/303 |
| | | | 424/445 |
| 2011/0244443 A1 | 10/2011 | van Rijn et al. | |
| 2014/0228463 A1* | 8/2014 | Gupta | C08F 120/16 |
| | | | 521/149 |
| 2016/0002489 A1* | 1/2016 | Gleason | C09D 139/08 |
| | | | 210/500.27 |

FOREIGN PATENT DOCUMENTS

| | | |
|---|---|---|
| EP | 2 226 192 A1 | 9/2010 |
| WO | WO-2013/114297 A1 | 8/2013 |
| WO | WO-2014/095749 A1 | 6/2014 |

OTHER PUBLICATIONS

International Search Report dated Sep. 24, 2015, from PCT/US2015/039374.

* cited by examiner

DEVELOPMENT OF ZWITTERIONIC COATINGS THAT CONFER ULTRA ANTI-BIOFOULING PROPERTIES TO COMMERCIAL REVERSE OSMOSIS MEMBRANES

BACKGROUND OF THE INVENTION

Fouling refers to the undesirable attachment of organic matter, biomolecules, and microbes on submerged surfaces. Fouling diminishes the performance of devices involving these submerged surfaces and is considered the bottle-neck issue for various applications in the biomedical industry, food processing, and water treatment. Membrane fouling is a serious problem in processes such as reverse osmosis (RO) water desalination, industrial water treatment, juice concentration, and hemodialysis. On a separation membrane e.g., a RO membrane, a biofilm matrix forms and acts as a secondary membrane, which adversely affects the separation capabilities of the membrane. The biofilm causes a significant drop in trans-membrane pressure resulting in a decline in permeate water flux with time. To keep the permeate flux at optimum levels, higher operating pressures are required. Furthermore, the physical damage of the membrane caused by the biofilm results in increase in the salt passage (i.e., reduced salt rejection). To combat the adverse effects of biofouling, membranes must be frequently cleaned with harsh chemicals; chemical treatment of the membrane, in turn, results in shorter membrane life. The cumulative effect of all these factors causes an enormous increase in operating cost of the desalination process.

Developing anti-biofouling surfaces is an active area of research; it encompasses many applications, such as coating for ship hulls, biomedical implants, devices, and biosensors, food packaging, and industrial and marine equipment. However, this technique has not been explored fully in the case of separation membranes, such as RO membranes.

Zwitterionic materials have been explored for their ultra-low protein adsorption and outstanding antifouling properties, and have been extensively investigated as hydrophilic or fouling-resistance modifiers. Some relevant examples include the synthesis of sulfobetaine methacrylate (SBMA), 2-methaeryloyloxy ethyl phosphorylcholine (MPC), and carboxybetaine methacrylate (CBMA). These zwitterionic coatings have been used as hydrogels, polymer brushes, double-hydrophilic copolymer, and polyelectrolytes.

To synthesize zwitterionic coatings, several innovative techniques have been developed. For example, self-assembled monolayers (SAMs), solution polymerization and solvent evaporation, and atom transfer radical polymerization (ATRP) have been used. These methods have several limitations. For example, SAMs require specific surface functionality and, therefore, are limited to gold substrates only. ATRP methods require the use of harsh solvents, which are not compatible with delicate RO membranes. Furthermore, the use of solvents in solution polymerization and ATRP would not only damage the delicate RO membrane substrate, but may also lead to high surface roughness, which would diminish anti-biofouling properties of the coated surface.

One example of the synthesis of a polyzwitterionic membrane involved synthesis of amphiphilic precursor poly (vinylidene fluoride)-graft-N,N-dimethylaminoethyl methacrylate (PVDF-g-PDMAEMA) by ATRP, followed by blending with PVDF to prepare flat membranes. The membranes were then reacted in tetrahydrofuran (THF) solution with 1,3-propanesultone (1,3-PS) or 3-bromopropionic acid (3-BPA) to yield SBMAs or carboxybetaines acrylic acetates (CBAAs), respectively. Z. Yi et al. *J. Membr. Sci.* 385-386 (2011) 57-66. By this method, only 70% of PDMAEMA was quaternized in 48 h for the 1,3-PS, while only 62% of PDMAEMA was quaternized for the 3-bromopropionic in 96 h. Lower conversion (i.e., quaternization) of the PDMAEMA precursor may be the result of both synthesis by ATRP which may render some of the PDMAEMA inaccessible to the quaternizing agent. Alternatively, or in addition, the lower diffusion kinetics of liquid-phase reactions, as compared to gas-phase reactions, may play a role.

Another example involved the preparation of a co-polymer film by reacting 2-(dimethylamino)ethyl methacrylate (DMAEMA) and ethylene glycol dimethacrylate via initiated chemical vapor deposition (iCVD). The film was then treated with 1,3-PS to convert the amphiphilic precursor DMAEMA to zwitterions (polysulfobetaines (pSBs)). R. Yang et al. *Chem. Mater.* 2011, 23, 1263-1272. In contrast to most bulk solution-phase polymerization and solvent evaporation methods, this process resulted in a high concentration of zwitterionic moieties (up to 90%) on the top surface (~10 nm), which is desirable for antifouling applications. The high surface zwitterionic content was attributed to the diffusion-limited gas-phase reaction at the surface.

In addition, a zwitterionic poly(carboxymethylbetaine) (PCMB) brush on fused quartz has been described. T. Kondo et al. *Colloids and Surfaces B: Biointerfaces* 100 (2012) 126-132. This polymer was made by surface initiated ATRP of CMB monomer and displayed some desirable antifouling characteristics.

There exists a need for an efficient, reliable, environmental-friendly, solvent-less method of depositing chemically-stable antifouling coatings on reverse osmosis membranes.

SUMMARY OF THE INVENTION

In certain embodiments, the invention relates to a polymer, comprising a plurality of first repeat units, and a plurality of second repeat units; wherein the first repeat unit is

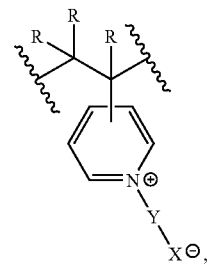

wherein, independently for each occurrence,

R is H, alkyl, halo, hydroxy, amino, nitro, or cyano;

Y is a linker that does not comprise an amide bond, an ester bond, or an ether bond; and $X^{\ominus}$ is $-SO_3^{\ominus}$ or $-COO^{\ominus}$;

the second repeat unit is

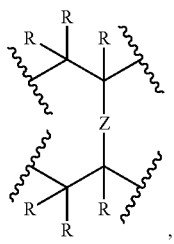

wherein, independently for each occurrence,
R is H, alkyl, halo, hydroxy, amino, nitro, or cyano;
Z is

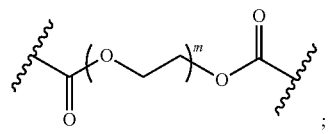

and
m is 1-10, inclusive.

In certain embodiments, the invention relates to a composition, wherein the composition comprises a substrate and a coating material, wherein the coating material comprises any one of the polymers described herein.

In certain embodiments, the invention relates to an article comprising any one of the compositions described herein, wherein the article is incorporated into a water desalination device.

In certain embodiments, the invention relates to a method comprising
contacting, at a first flow rate, a first sample of water with any one of the compositions described herein, thereby producing a second sample of water,
wherein the first sample of water comprises a first concentration or first quantity of a substance; the second sample of water comprises a second concentration or second quantity of the substance; and the second concentration or second quantity is substantially lower than the first concentration or first quantity.

In certain embodiments, the invention relates to a method of coating a surface of a substrate, comprising the steps of:
providing a substrate;
exposing a surface of the substrate to plasma for a first period of time at a first pressure, thereby producing a conditioned surface of the substrate;
contacting the conditioned surface of the substrate with a polymer comprising a second repeat unit and a third repeat unit, wherein the second repeat unit is

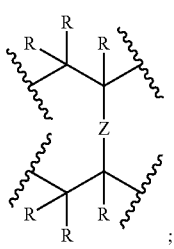

the third repeat unit is

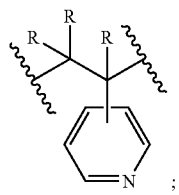

R is H, alkyl, halo, hydroxy, amino, nitro, or cyano; Z is and m is 1-10, inclusive, thereby producing a pyridine-coated substrate.

DETAILED DESCRIPTION OF THE INVENTION

Overview

Figure 1:
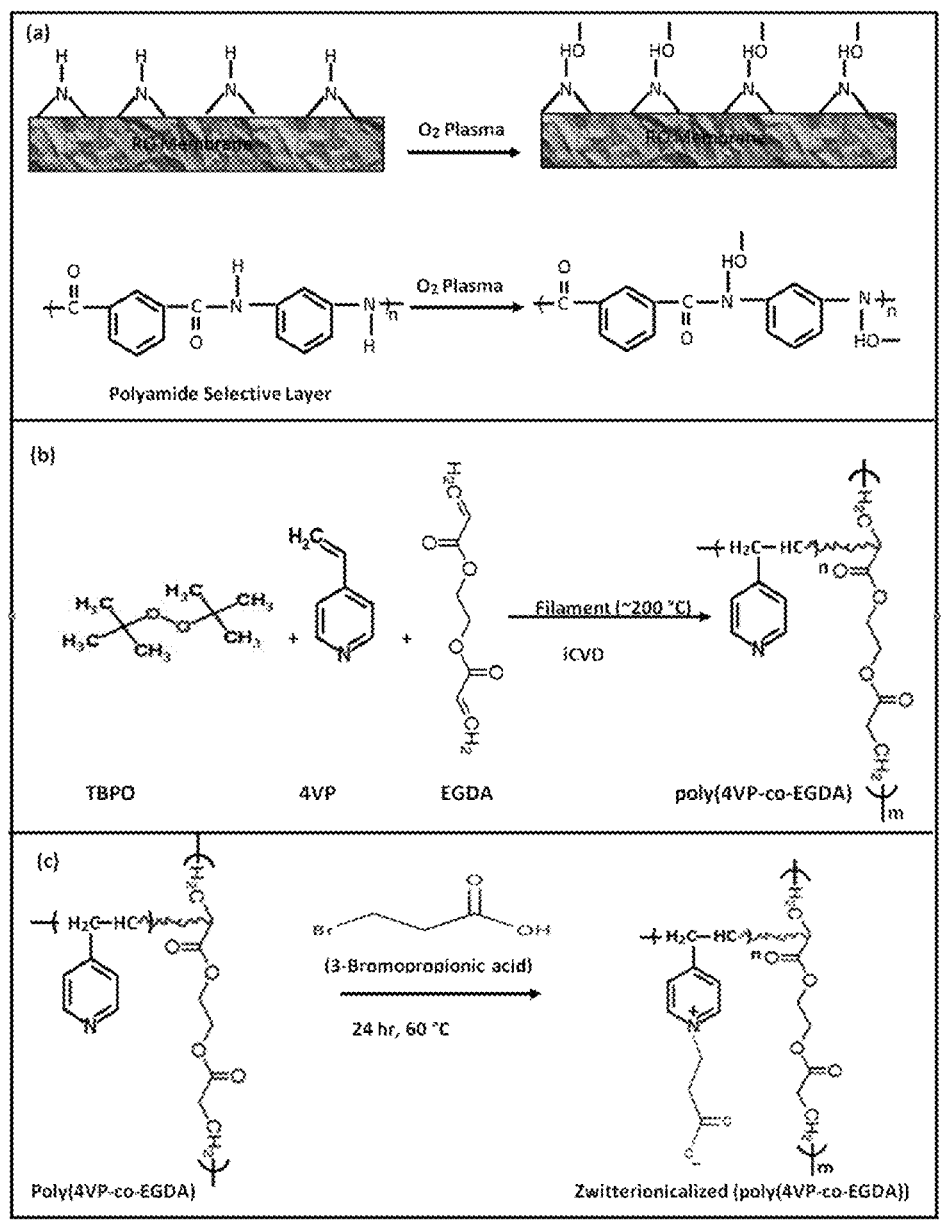
FIG. 1 depicts the structure and a synthetic route for the formation of copolymer films: (a) surface modification of active polyamide layer by $O_2$ plasma treatment; (b) synthesis of copolymer films by iCVD; and (c) post-deposition functionalization with quaternizing agent 3-BPA.

In certain embodiments, the invention relates to the solventless preparation of films of poly(4-vinylpyridine-co-ethylene glycol diacrylate) (p(4-VP-co-EGDA)) thin films using initiated chemical vapor deposition (iCVD). In certain embodiments, pyridine repeat units in films deposited by iCVD are subject to post-deposition functionalization by 3-bromopropionic acid (3-BPA) and converted to zwitterionic structures, which are fouling resistant. In certain embodiments, the antifouling coatings prepared by a solventless procedure are useful in the water desalination industry. In certain embodiments, the films are applied to reverse osmosis (RO) desalination membranes. In certain embodiments, the salt-rejection properties of the RO membranes remain the same after the modification, indicating this mild process does not affect the extremely delicate semipermeable layer. In certain embodiments, permeability to water is affected only slightly by the coating. In certain embodiments, tunable crosslinking density gives rise to adjustable water permeability.

In certain embodiments, the invention relates to an antifouling coating. The coating may derive from poly(4-vinylpyridine) (p(4-VP)), which has been used as the precursor for antimicrobial coatings. In certain embodiments, quaternization is performed on p(4-VP) to obtain a positively-charged surface that is able to penetrate and degrade cell membranes of various microbes. However, the surface charge induces attachment of proteins and microbes with the opposite charge, and these species can remain on the surface and diminish the surface antimicrobial activity. So, the p(4-VP) is reacted with 3-BPA to obtain a zwitterionic chemistry with balanced surface charge. In certain embodiments, the invention relates to a coating having a high percentage of surface zwitterions containing polycarboxybetaine acrylic acetate (pCBAA) units.

In certain embodiments, the coating is deposited on commercially available RO membranes via initiated chemical vapor deposition (iCVD), a vapor phase deposition technique, followed by a vapor phase derivatization. In certain embodiments, the vapor-phase deposition and derivatization enables surface modification of delicate substrates, such as RO membranes. In certain embodiments, the invention relates to quaternization by 3-BPA in the vapor phase. In certain embodiments, since surface tension and de-wetting are avoided, the all-dry process conforms to the geometry of the underlying substrate. In addition, the benign reaction conditions allow full retention of functionalities. In certain embodiments, the substrate-independent method is time-efficient and scalable to industrial scale roll-to-roll infrastructure. In certain embodiments, multiple substrates can be coated simultaneously.

In certain embodiments, the iCVD synthesis is carried out at low substrate temperature (20° C.) to produce robustly adhered, smooth, ultrathin layers (30 nm) directly on even delicate substrates, such as RO membranes without damaging them.

Chemistry of the deposited copolymer films may be controlled by adjusting the flow rates of the monomers 4-vinylpyridine (4-VP) and ethylene glycol diacrylate (EGDA). Conversion of as-deposited copolymer films to zwitterionic moieties was confirmed by FTIR and high resolution XPS N1s scans. Static contact angle measurements revealed that, in certain embodiments, the modified RO membranes were more hydrophilic as compared to their counterpart bare membranes and, furthermore, deposited copolymer coatings were found stable in DI water. Biopolymer adsorption of the deposited copolymer coatings was investigated by quartz crystal microbalance with dissipation (QCM-D) using a model foulant (bovin serum albumin) (BSA). Biofouling propensity of the optimized zwitterionic coating was investigated by counting the attached E. coli cells under static condition. In certain embodiments, bacterial adhesion results revealed that the modified membranes showed 97% less adhesion of micro-organism when compared to bare membranes indicating the effectiveness and superior performance of optimized copolymer coatings against bacterial adhesion. Performance evaluation (permeate flux and % salt rejection) of the modified membranes was measured utilizing cross flow permeation cells and compared to the virgin RO membranes. In certain embodiments, surface topology studies by AFM demonstrated that modified RO membranes showed lower RMS roughness when compared to virgin RO membranes.

Initiated Chemical Vapor Deposition

Materials-processing often involves the deposition of films or layers on a surface of a substrate. One manner of effecting the deposition of such films or layers is through chemical vapor deposition (CVD). CVD involves a chemical reaction of vapor phase chemicals or reactants that contain the constituents to be deposited on the substrate. Reactant gases are introduced into a reaction chamber or reactor, and are decomposed and reacted at a heated surface to form the desired film or layer.

One method of CVD is initiated CVD (iCVD). In an iCVD process, thin filament wires are heated, thus supplying the energy to fragment a thermally-labile initiator, thereby forming a radical at moderate temperatures. The use of an initiator not only allows the chemistry to be controlled, but also accelerates film growth and provides control of molecular weight and rate. The energy input is low due to the low filament temperatures, but high growth rates may be achieved. The process progresses independent from the shape or composition of the substrate, is easily scalable, and easily integrated with other processes.

In certain embodiments, iCVD takes place in a reactor. In certain embodiments, a variety of monomer species may be polymerized and deposited by iCVD; these monomer species are well-known in the art. In certain embodiments, the surface to be coated is placed on a stage in the reactor and gaseous precursor molecules are fed into the reactor; the stage may be the bottom of the reactor and not a separate entity. In certain embodiments, a variety of carrier gases are useful in iCVD; these carrier gases are well-known in the art.

In certain embodiments, the iCVD reactor has automated electronics to control reactor pressure and to control reactant flow rates. In certain embodiments, any unreacted vapors may be exhausted from the system.

In certain embodiments, the iCVD coating process can take place at a range of pressures from atmospheric pressure to low vacuum. In certain embodiments, the pressure is less than about 50 torr. In certain embodiments, the pressure is less than about 40 torr. In certain embodiments, the pressure is less than about 30 torr. In certain embodiments, the pressure is less than about 20 torr. In certain embodiments, the pressure is less than about 10 torr. In certain embodiments, the pressure is less than about 5 torr. In certain embodiments, the pressure is less than about 1 torr. In certain embodiments, the pressure is less than about 0.7 torr. In certain embodiments, the pressure is less than about 0.4 torr. In certain embodiments, the pressure is about 50 torr. In certain embodiments, the pressure is about 40 torr. In certain embodiments, the pressure is about 30 torr. In certain embodiments, the pressure is about 20 torr. In certain embodiments, the pressure is about 10 torr. In certain embodiments, the pressure is about 5 torr. In certain embodiments, the pressure is about 1 torr. In certain embodiments, the pressure is about 0.7 torr. In certain embodiments, the pressure is about 0. torr. In certain embodiments, the pressure is about 0.5 torr. In certain embodiments, the pressure is about 0.4 torr. In certain embodiments, the pressure is about 0.3 torr. In certain embodiments, the pressure is about 0.2 torr. In certain embodiments, the pressure is about 0.1 torr. In certain embodiments the pressure is about 1 torr; about 0.9 torr; about 0.8 torr; about 0.7 torr; about 0.6 torr; about 0.5 torr; about 0.4 torr; about 0.3 torr; about 0.2 torr; or about 0.1 torr.

In certain embodiments, the flow rate of the monomer can be adjusted in the iCVD method. In certain embodiments, the monomer flow rate is about 100 sccm (standard cubic centimeters per minute). In certain embodiments, the monomer flow rate is about 90 sccm. In certain embodiments, the monomer flow rate is about 80 sccm. In certain embodiments the monomer flow rate is about 70 sccm. In certain embodiments, the monomer flow rate is about 60 sccm. In certain embodiments, the monomer flow rate is about 50 sccm. In certain embodiments, the monomer flow rate is about 40 sccm. In certain embodiments, the monomer flow rate is about 30 sccm. In certain embodiments, the monomer flow rate is about 20 sccm. In certain embodiments, the monomer flow rate is less than about 100 sccm. In certain embodiments, the monomer flow rate is less than about 90 sccm. In certain embodiments, the monomer flow rate is less than about 80 sccm. In certain embodiments, the monomer flow rate is less than about 70 sccm. In certain embodiments, the monomer flow rate is less than about 60 sccm. In certain embodiments, the monomer flow rate is less than about 50 sccm. In certain embodiments, the monomer flow rate is less than about 40 sccm. In certain embodiments, the monomer flow rate is less than about 30 sccm. In certain embodiments, the monomer flow rate is less than about 20 sccm. In certain embodiments, the monomer flow rate is about 15 sccm. In certain embodiments, the flow rate is less than about 15 sccm. In certain embodiments, the monomer flow rate is about 14 sccm. In certain embodiments, the flow rate is less than about 14 sccm. In certain embodiments, the monomer flow rate is about 13 sccm. In certain embodiments, the flow rate is less than about 13 sccm. In certain embodiments, the monomer flow rate is about 12 sccm. In certain embodiments, the flow rate is less than about 12 sccm. In certain embodiments, the monomer flow rate is about 11 sccm. In certain embodiments, the flow rate is less than about 11 sccm. In certain embodiments, the monomer flow rate is about 10 sccm. In certain embodiments, the flow rate is less than about 10 sccm. In certain embodiments, the monomer flow rate is about 9 sccm. In certain embodiments, the flow rate is less than about 9 sccm. In certain embodiments, the monomer flow rate is about 8 sccm. In certain embodiments, the flow rate is less than about 8 sccm. In certain embodiments, the monomer flow rate is about 7 sccm. In certain embodiments, the flow rate is less than about 7 sccm. In certain embodiments, the monomer flow rate is about 6 sccm. In certain embodiments, the flow rate is less than about 6 sccm. In certain embodiments, the monomer flow rate is about 5 sccm. In certain embodiments, the flow rate is less than about 5 sccm. In certain embodiments, the monomer flow rate is about 3 sccm. In certain embodiments, the flow rate is less than about 3 sccm. In certain embodiments, the monomer flow rate is about 1.5 sccm. In certain embodiments, the flow rate is less than about 1.5 sccm. In certain embodiments, the monomer flow rate is about 0.75 sccm. In certain embodiments, the flow rate is less than about 0.75 sccm. In certain embodiments, the monomer flow rate is about 0.6 sccm. In certain embodiments, the flow rate is less than about 0.6 sccm. In certain embodiments, the monomer flow rate is about 0.5 sccm. In certain embodiments, the flow rate is less than about 0.5 sccm. When more than one monomer is used (i.e., to deposit co-polymers), the flow rate of the additional monomers, in certain embodiments, may be the same as those presented above.

In certain embodiments, the temperature of the monomer can be adjusted in the iCVD method. In certain embodiments, the monomer can be heated and delivered to the chamber by a heated mass flow controller. In certain embodiments, the monomer can be heated and delivered to the chamber by a needle valve. In certain embodiments, the monomer is heated at about 30° C., about 35° C., about 40° C., about 45° C., about 50° C., about 55° C., about 60° C., about 65° C., about 70° C., about 75° C., about 80° C., about 85° C., about 90° C., about 95° C., or about 100° C.

In certain embodiments, the flow rate of the initiator can be adjusted in the iCVD method. In certain embodiments the initiator flow rate is about 100 sccm. In certain embodiments, the initiator flow rate is about 90 sccm. In certain embodiments, the initiator flow rate is about 80 sccm. In certain embodiments, the initiator flow rate is about 70 sccm. In certain embodiments, the initiator flow rate is about 60 sccm. In certain embodiments, the initiator flow rate is about 50 sccm. In certain embodiments, the initiator flow rate is about 40 sccm. In certain embodiments, the initiator flow rate is about 30 sccm. In certain embodiments, the initiator flow rate is about 20 sccm. In certain embodiments, the initiator flow rate is less than about 100 sccm. In certain embodiments, the initiator flow rate is less than about 90 sccm. In certain embodiments, the initiator flow rate is less than about 80 sccm. In certain embodiments, the initiator flow rate is less than about 70 sccm. In certain embodiments, the initiator flow rate is less than about 60 sccm. In certain embodiments, the initiator flow rate is less than about 50 sccm. In certain embodiments, the initiator flow rate is less than about 40 sccm. In certain embodiments, the initiator flow rate is less than about 30 sccm. In certain embodiments, the initiator flow rate is less than about 20 sccm. In certain embodiments, the initiator flow rate is about 10 sccm. In certain embodiments, the flow rate is less than about 10 sccm. In certain embodiments, the initiator flow rate is about 5 sccm. In certain embodiments, the flow rate is less than about 5 sccm. In certain embodiments, the initiator flow rate is about 3 sccm. In certain embodiments, the flow rate is less than about 3 sccm. In certain embodiments, the initiator flow rate is about 1.5 sccm. In certain embodiments, the flow rate is less than about 1.5 sccm. In certain embodiments, the initiator flow rate is about 0.75 sccm. In certain embodiments, the flow rate is less than about 0.75 sccm. In certain embodiments, the initiator flow rate is about 0.5 sccm. In certain embodiments, the flow rate is less than about 0.5 sccm. In certain embodiments, the initiator flow rate is about 0.4 sccm. In certain embodiments, the flow rate is less than about 0.4 sccm. In certain embodiments, the initiator flow rate is about 0.3 sccm. In certain embodiments, the flow rate is less than about 0.3 sccm. In certain embodiments, the initiator flow rate is about 0.2 sccm. In certain embodiments, the flow rate is less than about 0.2 sccm. In certain embodiments, the initiator flow rate is about 0.1 sccm. In certain embodiments, the flow rate is less than about 0.1 sccm. In certain embodiments, a variety of initiators are useful in iCVD; these initiators are well-known in the art.

In certain embodiments, the carrier gas is an inert gas. In certain embodiments, the carrier gas is nitrogen or argon.

In certain embodiments, the flow rate of the carrier gas can be adjusted in the iCVD method. In certain embodiments, the carrier gas flow rate is about 1000 sccm. In certain embodiments, the carrier gas flow rate is about 900 sccm. In certain embodiments, the carrier gas flow rate is about 800 sccm. In certain embodiments, the carrier gas flow rate is about 700 sccm. In certain embodiments, the carrier gas flow rate is about 600 sccm. In certain embodiments, the carrier gas flow rate is about 500 sccm. In certain embodiments, the carrier gas flow rate is about 400 sccm. In certain embodiments, the carrier gas flow rate is about 300 sccm. In certain embodiments, the carrier gas flow rate is about 200 sccm. In certain embodiments, the carrier gas flow rate is about 100 sccm. In certain embodiments, the carrier gas flow rate is about 90 sccm. In certain embodiments, the carrier gas flow rate is about 80 sccm. In certain embodiments, the carrier gas flow rate is about 70 sccm. In certain embodiments, the carrier gas flow rate is about 60 sccm. In certain embodiments, the carrier gas flow rate is about 50 sccm. In certain embodiments, the carrier gas flow rate is about 40 sccm. In certain embodiments, the carrier gas flow rate is about 30 sccm. In certain embodiments, the carrier gas flow rate is about 20 sccm. In certain embodiments, the carrier gas flow rate is less than about 1000 sccm. In certain embodiments, the carrier gas flow rate is less than about 900 sccm. In certain embodiments, the carrier gas flow rate is less than about 800 sccm. In certain embodiments, the carrier gas flow rate is less than about 700 sccm. In certain embodiments, the carrier gas flow rate is less than about 600 sccm. In certain embodiments, the carrier gas flow rate is less than about 500 sccm. In certain embodiments, the carrier gas flow rate is less than about 400 sccm. In certain embodiments, the carrier gas flow rate is less than about 300 sccm. In certain embodiments, the carrier gas flow rate is less than about 200 sccm. In certain embodiments, the carrier gas flow rate is less than about 100 sccm. In certain embodiments, the carrier gas flow rate is less than about 90 sccm. In certain embodiments, the carrier gas flow rate is less than about 80 sccm. In certain embodiments, the carrier gas flow rate is less than about 70 sccm. In certain embodiments, the carrier gas flow rate is less than about 60 sccm. In certain embodiments the carrier gas flow rate is less than about 50 sccm. In certain, embodiments the carrier gas flow rate is less than about 40 sccm. In certain embodiments, the carrier gas flow rate is less than about 30 sccm. In certain embodiments, the carrier gas flow rate is less than about 20 sccm. In certain embodiments, the carrier gas flow rate is about 10 sccm. In certain embodiments, the flow rate is less than about 10 sccm. In certain embodiments, the carrier gas flow rate is about 5 sccm. In certain embodiments, the flow rate is less than about 5 sccm. In certain embodiments, the carrier gas flow rate is about 4 sccm. In certain embodiments, the flow rate is less than about 4 sccm. In certain embodiments, the carrier gas flow rate is about 3 sccm. In certain embodiments, the flow rate is less than about 3 sccm. In certain embodiments, the carrier gas flow rate is about 2 sccm. In certain embodiments, the flow rate is less than about 2 sccm. In certain embodiments, the carrier gas flow rate is about 1 sccm. In certain embodiments, the flow rate is less than about 1 sccm.

In certain embodiments, the temperature of the filament can be adjusted in the iCVD method. In certain embodiments the temperature of the filament is about 350° C. In certain embodiments the temperature of the filament is about 300° C. In certain embodiments the temperature of the filament is about 250° C. In certain embodiments the temperature of the filament is about 245° C. In certain embodiments the temperature of the filament is about 235° C. In certain embodiments the temperature of the filament is about 225° C. In certain embodiments the temperature of the filament is about 200° C. In certain embodiments the temperature of the filament is about 150° C. In certain embodiments the temperature of the filament is about 100° C.

In certain embodiments, the filament is from about 0.1 cm to about 20 cm from the substrate stage. In certain embodiments, the filament is about 0.1 cm, about 0.2 cm, about 0.3 cm, about 0.4 cm, about 0.5 cm, about 0.6 cm, about 0.7 cm, about 0.8 cm, about 0.9 cm, about 1.0 cm, about 1.1 cm, about 1.2 cm, about 1.3 cm, about 1.4 cm, about 1.5 cm, about 1.6 cm, about 1.7 cm, about 1.8 cm, about 1.9 cm, about 2.0 cm, about 2.1 cm, about 2.2 cm, about 2.3 cm, about 2.4 cm, about 2.5 cm, about 3.0 cm, about 3.5 cm, about 4.0 cm, about 4.5 cm, about 5.0 cm, about 5.5 cm, about 6.0 cm, about 6.5 cm, about 7.0 cm, about 7.5 cm, about 8.0 cm, about 8.5 cm, about 9.0 cm, about 9.5 cm, about 10 cm, about 11 cm, about 12 cm, about 13 cm, about 14 cm, about 15 cm, about 16 cm, about 17 cm, about 18 cm, about 19 cm, or about 20 cm from the substrate stage. In certain embodiments, the filament is about 1.4 cm from the substrate stage.

In certain embodiments, the filament is oriented in any orientation with respect to the substrate stage or the chamber. In certain embodiments, the filament is oriented above the substrate stage, below the substrate stage, or beside the substrate stage.

In certain embodiments, the iCVD coating process can take place at a range of temperatures of the substrate stage. In certain embodiments, the temperature of the substrate stage is ambient temperature. In certain embodiments, the temperature of the substrate stage is about 20° C.; in yet other embodiments the temperature of the substrate stage is between about 10° C. and about 100° C., or between about 0° C. and about 25° C. In certain embodiments said temperature of the substrate stage is controlled by water.

In certain embodiments, the rate of polymer deposition is about 1 micron/minute. In certain embodiments, the rate of polymer deposition is between about 1 micron/minute and about 50 nm/minute. In certain embodiments, the rate of polymer deposition is between about 10 micron/minute and about 50 nm/minute. In certain embodiments, the rate of polymer deposition is between about 100 micron/minute and about 50 nm/minute. In certain embodiments, the rate of polymer deposition is between about 1 nm/minute and about 50 nm/minute. In certain embodiments, the rate of polymer deposition is between about 10 nm/minute and about 50 nm/minute. In certain embodiments, the rate of polymer deposition is between about 10 nm/minute and about 25 nm/minute.

Polymers of the Invention

In certain embodiments, the invention relates to a polymer, comprising a plurality of first repeat units, and a plurality of second repeat units; wherein
the first repeat unit is

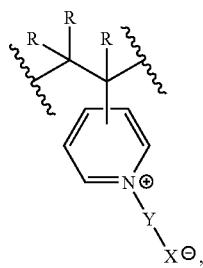

wherein, independently for each occurrence,
R is H, alkyl, halo, hydroxy, amino, nitro, or cyano;
Y is a linker that does not comprise an amide bond, an ester bond, or an ether bond; and
$X^\ominus$ is $-SO_3^\ominus$ or $-COO^\ominus$;
the second repeat unit is

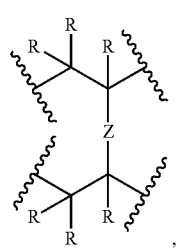

wherein, independently for each occurrence,
R is H, alkyl, halo, hydroxy, amino, nitro, or cyano;
Z is

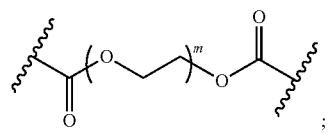

and
m is 1-10, inclusive.

In certain embodiments, the invention relates to a polymer, comprising a plurality of first repeat units, a plurality of second repeat units, and a plurality of third repeat units; wherein
the first repeat unit is

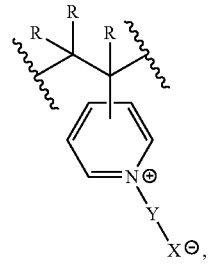

wherein, independently for each occurrence,
R is H, alkyl, halo, hydroxy, amino, nitro, or cyano;
Y is a linker that does not comprise an amide bond, an ester bond, or an ether bond; and
$X^\ominus$ is $-SO_3^\ominus$ or $-COO^\ominus$;
the second repeat unit is

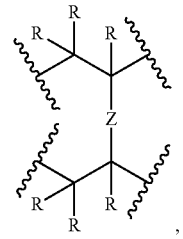

wherein, independently for each occurrence,
R is H, alkyl, halo, hydroxy, amino, nitro, or cyano;
Z is

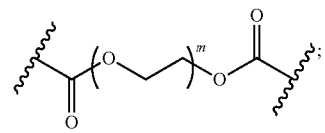

m is 1-10, inclusive; and
the third repeat unit is

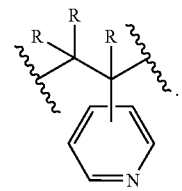

In certain embodiments, the invention relates to any one of the aforementioned polymers, wherein the polymer comprises the second repeat unit in an amount of about 1-99 mol %, about 5-95 mol %, about 5-90 mol %, about 10-85 mol %, about 10-80 mol %, about 15-75 mol %, about 15-70 mol %, about 20-65 mol %, about 20-60 mol %, about 25-55 mol %, or about 25-50 mol %. In certain embodiments, the invention relates to any one of the aforementioned polymers, wherein the polymer comprises the second repeat unit in an amount of about 8-22 mol %. In certain embodiments, the invention relates to any one of the aforementioned polymers, wherein the polymer comprises the second repeat unit in an amount of 8 mol %, about 9 mol %, about 10 mol %, about 11 mol %, about 12 mol %, about 13 mol %, about 14 mol %, about 15 mol %, about 16 mol %, about 17 mol %, about 18 mol %, about 19 mol %, about 20 mol %, about 21 mol %, or about 22 mol %.

In certain embodiments, the invention relates to any one of the aforementioned polymers, wherein the first repeat unit is

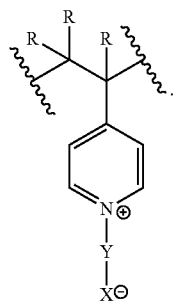

In certain embodiments, the invention relates to any one of the aforementioned polymers, wherein R is H or alkyl. In certain embodiments, the invention relates to any one of the aforementioned polymers, wherein R is H.

In certain embodiments, the invention relates to any one of the aforementioned polymers, wherein Y is alkylene. In certain embodiments, the invention relates to any one of the aforementioned polymers, wherein Y is ethylene. In certain embodiments, the invention relates to any one of the aforementioned polymers, wherein Y is 1,2-ethylene.

In certain embodiments, the invention relates to any one of the aforementioned polymers, wherein X is $-COO^{\ominus}$.

In certain embodiments, the invention relates to any one of the aforementioned polymers, wherein m is 1, 2, or 3. In certain embodiments, the invention relates to any one of the aforementioned polymers, wherein m is 1.

In certain embodiments, the invention relates to any one of the aforementioned polymers, wherein the polymer consists essentially of a plurality of first repeat units and a plurality of second repeat units.

In certain embodiments, the invention relates to any one of the aforementioned polymers, wherein the polymer consists essentially of a plurality of first repeat units, a plurality of second repeat units, and a plurality of third repeat units.

In certain embodiments, the invention relates to any one of the aforementioned polymers, wherein the number ratio of first repeat units to third repeat units is greater than about 5:1. In certain embodiments, the invention relates to any one of the aforementioned polymers, wherein the number ratio of first repeat units to third repeat units is about 6:1, about 7:1, about 8:1, about 9:1, about 10:1, about 11:1, about 12:1, about 13:1, about 14:1, about 15:1, about 16:1, about 17:1, about 18:1, or about 19:1 or higher. In certain embodiments, the invention relates to any one of the aforementioned polymers, wherein the number ratio of first repeat units to third repeat units is about 9:1.

Compositions of the Invention

In certain embodiments, the invention relates to a composition, wherein the composition comprises a substrate and a coating material, wherein the coating material comprises any one of the aforementioned polymers.

In certain embodiments, the invention relates to any one of the aforementioned compositions, wherein coating material consists essentially of any one of the aforementioned polymers.

In certain embodiments, the invention relates to any one of the aforementioned compositions, wherein the thickness of the coating material is from about 10 nm to about 1500 nm. In certain embodiments, the invention relates to any one of the aforementioned compositions, wherein the thickness of the coating material is about 10 nm, about 20 nm, about 30 nm, about 40 nm, about 50 nm, about 60 nm, about 70 nm, about 80 nm, about 90 nm, about 100 nm, about 125 nm, about 150 nm, about 175 nm, about 200 nm, about 225 nm, about 250 nm, about 275 nm, about 300 nm, about 325 nm, about 350 nm, about 375 nm, about 400 nm, about 425 nm, about 450 nm, about 475 nm, about 500 nm, about 525 nm, about 550 nm, about 575 nm, about 600 nm, about 625 nm, about 650 nm, about 675 nm, about 700 nm, about 725 nm, about 750 nm, about 775 nm, about 800 nm, about, 825 nm, about 850 nm, about 875 nm, about 900 nm, about 1000 nm, about 1100 nm, about 1200 nm, about 1300 nm, about 1400 nm, or about 1500 nm.

In certain embodiments, the invention relates to any one of the aforementioned compositions, wherein the substrate is homogeneous.

In certain embodiments, the invention relates to any one of the aforementioned compositions, wherein the substrate is heterogeneous.

In certain embodiments, the invention relates to any one of the aforementioned compositions, wherein the substrate is planar or non-planar.

In certain embodiments, the invention relates to any one of the aforementioned compositions, wherein the substrate is porous.

In certain embodiments, the invention relates to any one of the aforementioned compositions, wherein the substrate comprises a polysulfone, a polyimide, or a polyamide.

In certain embodiments, the invention relates to any one of the aforementioned compositions, wherein the substrate comprises a polyamide.

In certain embodiments, the invention relates to any one of the aforementioned compositions, wherein the surface of the substrate is concave or convex.

In certain embodiments, the invention relates to any one of the aforementioned compositions, wherein the substrate is a membrane.

In certain embodiments, the invention relates to any one of the aforementioned compositions, wherein the substrate is an RO membrane.

In certain embodiments, the invention relates to any one of the aforementioned compositions, wherein the substrate is a medical device.

In certain embodiments, the invention relates to any one of the aforementioned compositions, wherein the substrate is a surface of a hull of a ship, wherein said surface is exposed to water.

In certain embodiments, the invention relates to any one of the aforementioned compositions, wherein the substrate is a surface of an object exposed to water, wherein said surface is exposed to said water.

In certain embodiments, the invention relates to any one of the aforementioned compositions, wherein the substrate is a surface in a hospital operating theater.

In certain embodiments, the invention relates to any one of the aforementioned compositions, wherein the substrate is a surface of a floor in a hospital.

In certain embodiments, the invention relates to any one of the aforementioned compositions, wherein the substrate is a surface of a laboratory bench.

In certain embodiments, the invention relates to any one of the aforementioned compositions, wherein the substrate is a wooden surface.

In certain embodiments, the invention relates to any one of the aforementioned compositions, wherein the substrate is a surface of a food processing device.

In certain embodiments, the invention relates to any one of the aforementioned compositions, wherein the substrate is a surface on which food is prepared.

In certain embodiments, the invention relates to any one of the aforementioned compositions, wherein the substrate is a porcelain surface.

In certain embodiments, the invention relates to any one of the aforementioned compositions, wherein the substrate is a plastic surface.

In certain embodiments, the invention relates to any one of the aforementioned compositions, wherein the static contact angle is from about 20° to about 50°. In certain embodiments, the invention relates to any one of the aforementioned compositions, wherein the static contact angle is about 25°, about 26°, about 27°, about 28°, about 29°, about 30°, about 31°, about 32°, about 33°, about 34°, about 35°, about 36°, about 37°, about 38°, about 39°, about 40°, about 41°, about 42°, about 43°, about 44°, about 45°, about 46°, about 47°, or about 48°. In certain embodiments, the invention relates to any one of the aforementioned compositions, wherein the static contact angle is measured at about 25° C. and about 1 atm.

In certain embodiments, the invention relates to any one of the aforementioned compositions, wherein, upon exposure to a biomolecule, an area of the composition adsorbs less than about 80%, less than about 70%, less than about 60%, less than about 50%, less than about 40%, less than about 30%, less than about 20%, or less than about 10% by mass of the biomolecule, as compared to the mass of the biomolecule adsorbed by the same area of the substrate alone, without the coating material, under identical conditions. In certain embodiments, the biomolecule is a protein or an organism. In certain embodiments, the biomolecule is BSA.

In certain embodiments, the invention relates to any one of the aforementioned compositions, wherein, upon exposure to a quantity of an organism, an area of the composition adsorbs less than about 50%, less than about 40%, less than about 30%, less than about 20%, less than about 10%, less than about 5%, less than about 4%, less than about 3%, less than about 2%, or less than about 1% by number of the organism, as compared to the number of organisms adsorbed by the same area of the substrate alone, without the coating material, under identical conditions.

In certain embodiments, the invention relates to any one of the aforementioned compositions, wherein the permeability of the composition is about 50%, about 55%, about 60%, about 65%, about 70%, about 75%, about 80%, about 85%, about 90%, about 95%, or about 99% of the permeability of the substrate alone, without the coating material, under identical conditions.

In certain embodiments, the invention relates to any one of the aforementioned compositions, wherein the composition rejects about 70%, about 75%, about 80%, about 85%, about 90%, about 91%, about 92%, about 93%, about 94%, about 95%, about 96%, about 97%, about 98%, or about 99% of the salt in a feed solution. In certain embodiments, the invention relates to any one of the aforementioned compositions, wherein the feed solution comprises salt up to about 1000 ppm, about 1500 ppm, about 2000 ppm, about 2500 ppm, about 3000 ppm, 4000 ppm, 5000 ppm, 6000 ppm, 7000 ppm, 8000 ppm, 9000 ppm, about 10,000 ppm, about 15,000 ppm, about 20,000 ppm, about 25,000 ppm, about 30,000 ppm, or about 35,000 ppm. In certain embodiments, the invention relates to any one of the aforementioned compositions, wherein the salt in the feed solution is sodium chloride.

In certain embodiments, the invention relates to any one of the aforementioned compositions, wherein the coating material is not substantially soluble in ethanol.

In certain embodiments, the invention relates to any one of the aforementioned compositions, wherein the composition displays antifouling properties.

In certain embodiments, the invention relates to any one of the aforementioned compositions, wherein the composition maintains high flux after the coating process.

In certain embodiments, the invention relates to any one of the aforementioned compositions, wherein the composition maintains high salt rejection after the coating process.

In certain embodiments, the invention relates to any one of the aforementioned compositions, wherein the composition displays good coating stability in long-term use.

Another aspect of the invention relates to the composition obtained by the process of any one of methods discussed below.

Methods of the Invention

In certain embodiments, the invention relates to a method of coating a surface of a substrate, comprising the steps of:

providing a substrate;

exposing a surface of the substrate to oxygen plasma for a first period of time at a first pressure, thereby producing a conditioned surface of the substrate;

contacting the conditioned surface of the substrate with any one of the aforementioned polymers.

In certain embodiments, the invention relates to a method of coating a surface of a substrate, comprising the steps of:

providing a substrate;

exposing a surface of the substrate to plasma for a first period of time at a first pressure, thereby producing a conditioned surface of the substrate;

contacting the conditioned surface of the substrate with a polymer comprising a second repeat unit and a third repeat unit, wherein the second repeat unit is

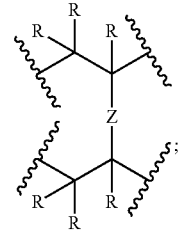

the third repeat unit is

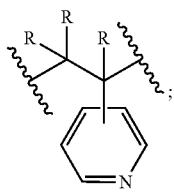

R is H, alkyl, halo, hydroxy, amino, nitro, or cyano; Z is

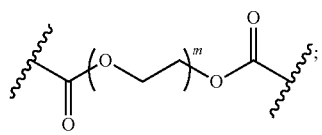

and m is 1-10, inclusive, thereby producing a pyridine-coated substrate.

In certain embodiments, the invention relates to any one of the aforementioned methods, further comprising the step of: contacting the pyridine-coated substrate with a zwitterionic precursor. The zwitterionic precursor may be any compound with a molecular weight less than 500 amu which comprises an electrophilic functional group that can react with a nucleophilic pyridine nitrogen atom, wherein upon reaction with the pyridine nitrogen atom a covalent bond is formed and a tethered anionic functional group (e.g., a carboxylate, sulfonate, or phosphonate) is produced. In certain embodiments, the zwitterionic precursor is 3-bromopropionic acid,

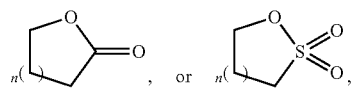

wherein n is 1, 2, or 3. In certain embodiments, the zwitterionic precursor is gaseous.

In certain embodiments, the invention relates to any one of the aforementioned methods, wherein the plasma is an oxygen plasma.

In certain embodiments, the invention relates to any one of the aforementioned methods, further comprising the steps of: providing a deposition chamber; and adding to the deposition chamber an initiator. The initiator may be any compound that decomposes to form free radicals. The initiator may be AIBN, an alkyl peroxide (e.g., tert-amyl peroxide or tert-butyl peroxide), or a dialkyl peroxide (e.g., di-tert-amyl peroxide or di-tert-butyl peroxide), triethylamine, tert-butyl peroxy benzoate, benzophenone, or 2,2'-azobis(2-methylpropane)

In certain embodiments, the invention relates to any one of the aforementioned methods, wherein the first period of time is about 2 s to about 10 min. In certain embodiments, the invention relates to any one of the aforementioned methods, wherein the first period of time is about 2 s, about 3 s, about 4 s, about 5 s, about 6 s, about 7 s, about 8 s, about 9 s, about 10 s, about 11 s, about 12 s, about 13 s, about 14 s, about 15 s, about 16 s, about 17 s, about 18 s, about 19 s, about 20 s, about 25 s, about 30 s, about 35 s, about 40 s, about 45 s, about 50 s, about 55 s, about 60 s, about 90 s, about 120 s, about 150 s, about 3 min, about 3.5 min, about 4 min, about 4.5 min, about 5 min, about 5.5 min, about 6 min, about 6.5 min, about 7 min, about 7.5 min, about 8 min, about 8.5 min, about 9 min, about 9.5 min, or about 10 min.

In certain embodiments, the invention relates to any one of the aforementioned methods, wherein the first pressure is about 5 mTorr to about 1000 mTorr. In certain embodiments, the invention relates to any one of the aforementioned methods, wherein the first pressure is about 5 mTorr, about 10 mTorr, about 15 mTorr, about 20 mTorr, about 25 mTorr, about 30 mTorr, about 35 mTorr, about 40 mTorr, about 45 mTorr, about 50 mTorr, about 75 mTorr, about 100 mTorr, about 125 mTorr, about 150 mTorr, about 175 mTorr, about 200 mTorr, about 225 mTorr, about 250 mTorr, about 300 mTorr, about 350 mTorr, about 400 mTorr, about 450 mTorr, about 500 mTorr, about 550 mTorr, about 600 mTorr, about 650 mTorr, about 700 mTorr, about 750 mTorr, about 800 mTorr, about 850 mTorr, about 900 mTorr, about 950 mTorr, or about 1000 mTorr.

In certain embodiments, the invention relates to any one of the aforementioned methods, wherein the polymer is deposited onto the conditioned surface.

In certain embodiments, the invention relates to any one of the aforementioned methods, wherein depositing the polymer comprises initiated chemical vapor deposition (iCVD) of the polymer in a deposition chamber.

In certain embodiments, the invention relates to any one of the aforementioned methods, wherein the deposition rate of the polymer onto the substrate is less than about 30 nm/min. In certain embodiments, the invention relates to any one of the aforementioned methods, wherein the deposition rate of the polymer onto the substrate is about 30 nm/min, about 28 nm/min, about 26 nm/min, about 24 nm/min, about 22 nm/min, about 20 nm/min, about 18 nm/min, about 16 nm/min, about 14 nm/min, about 12 nm/min, about 10 nm/min, about 9 nm/min, about 8 nm/min, about 7 nm/min, about 6 nm/min, about 5 nm/min, about 4 nm/min, about 3 nm/min, about 2 nm/min, or about 1 nm/min.

Applications and Articles of the Invention

In certain embodiments, the invention relates to an article comprising any one of the aforementioned compositions.

In certain embodiments, the invention relates to any one of the aforementioned articles, wherein the article is, or is incorporated into, a water desalination device.

Methods of Use

In certain embodiments, the invention relates to a method comprising contacting, at a first flow rate, a first sample of water with any one of the aforementioned compositions or articles, thereby producing a second sample of water, wherein the first sample of water comprises a first concentration or first quantity of a substance; the second sample of water comprises a second concentration or second quantity of the substance; and the second concentration or second quantity is substantially lower than the first concentration or first quantity.

In certain embodiments, the invention relates to any one of the aforementioned methods, wherein the second concentration or second quantity is about 0.

In certain embodiments, the invention relates to any one of the aforementioned methods, wherein the method is a method of water desalination. In certain embodiments, the invention relates to any one of the aforementioned methods, wherein the substance is salt. In certain embodiments, the invention relates to any one of the aforementioned methods, wherein the substance is salt; and the second quantity or second concentration is less than 4% of the first quantity or first concentration. In certain embodiments, the invention relates to any one of the aforementioned methods, wherein the substance is salt; and the second quantity or second concentration is about 3%, about 2%, or about 1% of the first quantity or first concentration.

In certain embodiments, the invention relates to any one of the aforementioned methods, wherein the method is a method of separating oil and water. In certain embodiments, the invention relates to any one of the aforementioned methods, wherein the substance is an oil.

EXEMPLIFICATION

The invention now being generally described, it will be more readily understood by reference to the following examples, which are included merely for purposes of illustration of certain aspects and embodiments of the invention, and are not intended to limit the invention.

Example 1

Synthesis of Copolymer Film and Zwitterion Formation

Materials and Methods

Different compositions of the same copolymer films p(4-VP-co-EGDA) were deposited in a custom built vacuum reactor (Sharon Vacuum) previously described (Martin, T. P. et al. *Biomaterials* 2007, 28, 909-915; and Ozaydin-Ince, G. et al. *J. Vac. Sci. Technol.*, A 2009, 27, 1135-1143). The monomers (EGDA (vapor pressure 0.0939 torr at 25° C.) and 4-VP (vapor pressure 1.68 torr at 25° C.)) and initiator (TBPO) were heated in separate glass jars attached to the reactor, and vapors were fed in to the chamber to react on the heated arrays of filament (80% Ni-20% Cr, Goodfellow). Flow rates of both the monomers were systematically changed (while keeping the initiator flow rate fixed) to obtain different compositions of the copolymer.

All chemicals were used as purchased without further purification. Test grade Silicon (Si) wafers (Wafer World, Palm Beach County, Fla., USA) were coated with copolymer p(4-VP-co-EGDA) without any pretreatment. Prior to deposition, commercial RO membranes TFC-HR (Koch Membrane System, USA) of area ~11×7 cm² were cleaned with high purity argon, and then treated with oxygen plasma treatment for five minutes. During iCVD depositions, tert-butyl peroxide (TBPO) (97%, Aldrich), EGDA (90%, Sigma Aldrich) 4-VP (95%, Sigma Aldrich) and argon were fed into the iCVD reactor at room temperature through mass flow controllers (1479 MFC, MKS Instruments). The monomers EGDA and 4-VP were heated up to 85° C. and 55° C., respectively, and systematic variation of the flow rates of both monomers were performed to yield varying zwitterionic contents on the deposited copolymer films. Films were deposited at a filament temperature of 180-200° C. and a substrate temperature of 20° C. Total pressure in the vacuum chamber was maintained at 0.450 Torr for all depositions. Table 1 describes the parameters adopted during iCVD and the subsequent compositions obtained for the deposited copolymer films.

TABLE 1 iCVD parameters adopted for the synthesis of homo and co-polymer films (p(4-VP-co-EGDA))

| Material | 4-VP Flow Rate (sccm) | TBPO Flow Rate (sccm) | EGDA Flow Rate (sccm) | Ar Flow Rate (sccm) | EGDA contents in the film* (%) |
|---|---|---|---|---|---|
| pEGDA | 0 | 2.0 | 5.0 | 2.0 | 100 |
| Copolymer 1 | 6.4 | 2.0 | 0.24 | 2.6 | 15 |
| Copolymer 2 | 6.0 | 2.0 | 0.58 | 2.5 | 54.5 |
| Copolymer 3 | 6.2 | 2.0 | 0.72 | 2.2 | 75 |
| p(4-VP) | 6.4 | 2.0 | 0 | 2.0 | 100 |

*composition was calculated by measuring carbonyl peak area of respective FTIR spectra and was normalized to the carbonyl peak area of homopolymer (pEGDA)

Depositing film thickness measurement and growth were monitored in situ by interferometry with a 633 nm He—Ne laser source (JDS Uniphase). Thickness of the deposited Si wafers were more accurately measured by J. A. Woollam M-2000 Spectroscopic Ellipsometer (J. A. Woollam Co., Inc., LINCOLN, Nebr., USA) at three different incident angles (65°, 70°, 75°) using 190 wavelengths from 315 to 718 nm. The data were fit using a Cauchy-Urbach model.

Post-deposition reaction of the coated substrates were performed by fixing them on top of a crystallization dish (VWR) with the coating facing downwards and using 1 g of 3-BPA (Sigma Aldrich, 97%) at the bottom of the dish, the whole assembly was placed in a water bath heated up to 60° C. for a specified period of time to let the vapor react with the coating on substrate. Treated specimens were thoroughly rinsed with deionized water (DI) to remove loosely adhered quaternizing agent.

Results and Discussion iCVD is a vapor-phase method used for conformal deposition of a variety of homo/co-polymers on virtually any substrate. Solvent-less/all dry nature of iCVD makes it particularly attractive when substrates to be coated are delicate such as commercial RO membranes. Thicker films (up to 250 nm) of homo-polymers p(4-VP), pEGDA and copolymer p(4-VP-co-EGDA) were first deposited on Si wafers. Deposition rate and growth of the films were controlled by adjusting the ratio of partial pressure of the monomer ($P_m$) and its saturated partial pressure ($P_{sat}$) at the temperature of the substrate during deposition namely, $P_m/P_{sat}$. This ratio was varied between 0.3 to 0.5 to optimize the deposition conditions and to control different compositions of the copolymer p(4-VP-co-EGDA) films. High $P_m/P_{sat}$ values usually correspond to high deposition rate and poor conformality. A $P_{4-VP}/P_{sat}$ of ~0.30 and a $P_{EGDA}/P_{sat}$ of ~0.15 were used in the copolymer depositions after optimization. The chemical composition of copolymer was controlled by adjusting flow rates of precursors, as shown in Table 1. In order to keep the total flow rate constant and maintain the same residence time for each deposition, continuous argon gas flow was used.

Prior to deposition, the membranes were cleaned by high purity argon gas and were then treated with $O_2$ plasma for 5 minutes to render some oxide dangling bonds on the membrane surface (FIG. 1-a). These dangling bonds are most likely to form between amine groups present in the active layer of polyamide RO membranes and help to establish strong interface (via covalent bonding) between membrane surface and the copolymer film. This strong bonding eliminates the delamination of the deposited copolymer film when placed in water. Maleic anhydride (MA) may be used to provide grafting between the copolymer and the substrate-RO membranes. However, the use of MA may be a serious concern since it can condense in the mass flow controllers (MFCs) and clog their surfaces, resulting in the need to pump the iCVD reactor for few hours to remove any physisorbed MA. As an alternative, oxygen plasma treatment is useful because it eliminates film delamination and avoids cumbersome MA treatment.

The gas-phase diffusion limited reaction between the quaternizing agent (3-BPA) and copolymer film yielded high conversion (~88% as calculated from high resolution N1s scan of XPS) of precursor tertiary nitrogen (the nitrogen in aromatic ring of 4-VP: the reactant) to quaternary nitrogen (the nitrogen in the reaction product: pyridinium ion). It is interesting to note that this high content of zwitterions was achieved only in 24 hours. It is also important to note that higher surface concentration of zwitterions (at the very top ~10 nm) is crucial to provide low fouling properties.

Example 2

Compositional Characterization of Deposited Copolymer Films

Materials and Methods

Nicolet Nexus 870 ESP Spectrometer (Thermo Nicolet, WI, USA) in normal transmission mode was used to obtain Fourier transform infrared (FTIR) spectra. A deuterated triglycine sulfate (DTGS) KBr detector over the range of 400-4000 $cm^{-1}$ was utilized with a 4-$cm^{-1}$ resolution. FTIR spectra of deposited Si wafers were measured immediately after deposition or post-treatment, and measured spectra were averaged over at least 100 scans to improve the signal-to-noise ratio. All FTIR spectra were baseline-corrected by subtracting a background spectrum of the Si wafer substrate and smoothed by averaging minimum 10 adjacent points.

X-ray photoelectron spectroscopy (XPS) survey spectrum and higher resolution spectra of N1s were obtained on a Kratos Axis Ultra Spectrometer (Surface Science Instrument, SSX-100) with a monochromatic Al Kα source. Samples were stored under vacuum overnight prior to analysis. Casa XPS (CasaXPS Manual 2.3.15, rev 1.3, 2009 Casa Software Ltd.) was used to fit the high-resolution spectra, with Shirley as the background. The high resolution spectra (C1s, O1s and N1s) obtained were calibrated with respect to C1s=284.5 eV to remove any charging effect.

Results and Discussion

Figure 2:
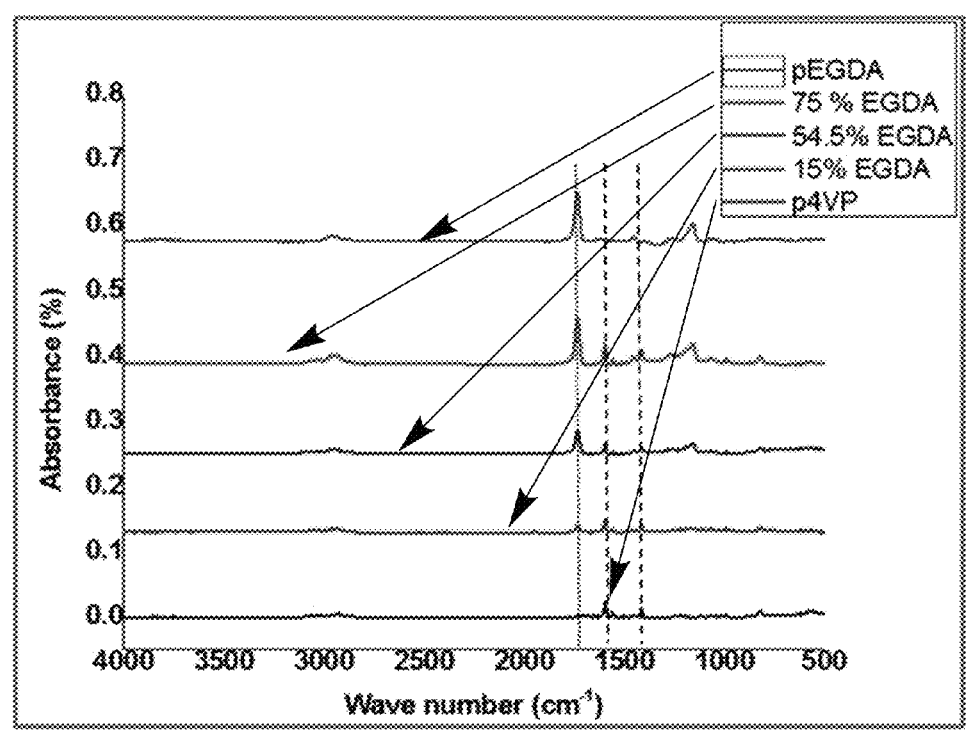
FIG. 2 depicts FTIR spectra of untreated (as deposited) homopolymer (pEDGA=top; p(4-VP)=bottom) and copolymer (poly(4-VP-EGDA)) films (75% EGDA=second from top; 54.5% EGDA=middle; and 15% EGDA=second from bottom). Dotted line indicates the carbonyl peak at 1734 $cm^{-1}$ and dashed lines represent major pyridine peaks at 1597 $cm^{-1}$ and 1415 $cm^{-1}$.

FIG. 2 shows FTIR spectra of as-deposited iCVD coatings: homo-polymers (p(4-VP) and pEGDA) and different compositions of copolymer films with varying amount of EGDA (cross linker). FTIR spectra of the copolymers are resolved into the characteristic functional groups present in both the constituent monomers. Peak at 1734 $cm^{-1}$ is a characteristic of carbonyl stretching present in the EGDA whereas peaks present at 1597, 1558 and 1415 $cm^{-1}$ are characteristics of aromatic ring in the pyridine. Relatively broader peak at 2960 $cm^{-1}$ is representative of various methyl and methylene groups attached to 4-VP and EGDA units in the copolymer film. To have the different cross linking densities and zwitterionic content in the copolymer films, the amount of EGDA was varied and calculated by the area under carbonyl peaks of respective FTIR spectrum and was normalized with respect to the homo-polymer (pEGDA).

Figure 3A:
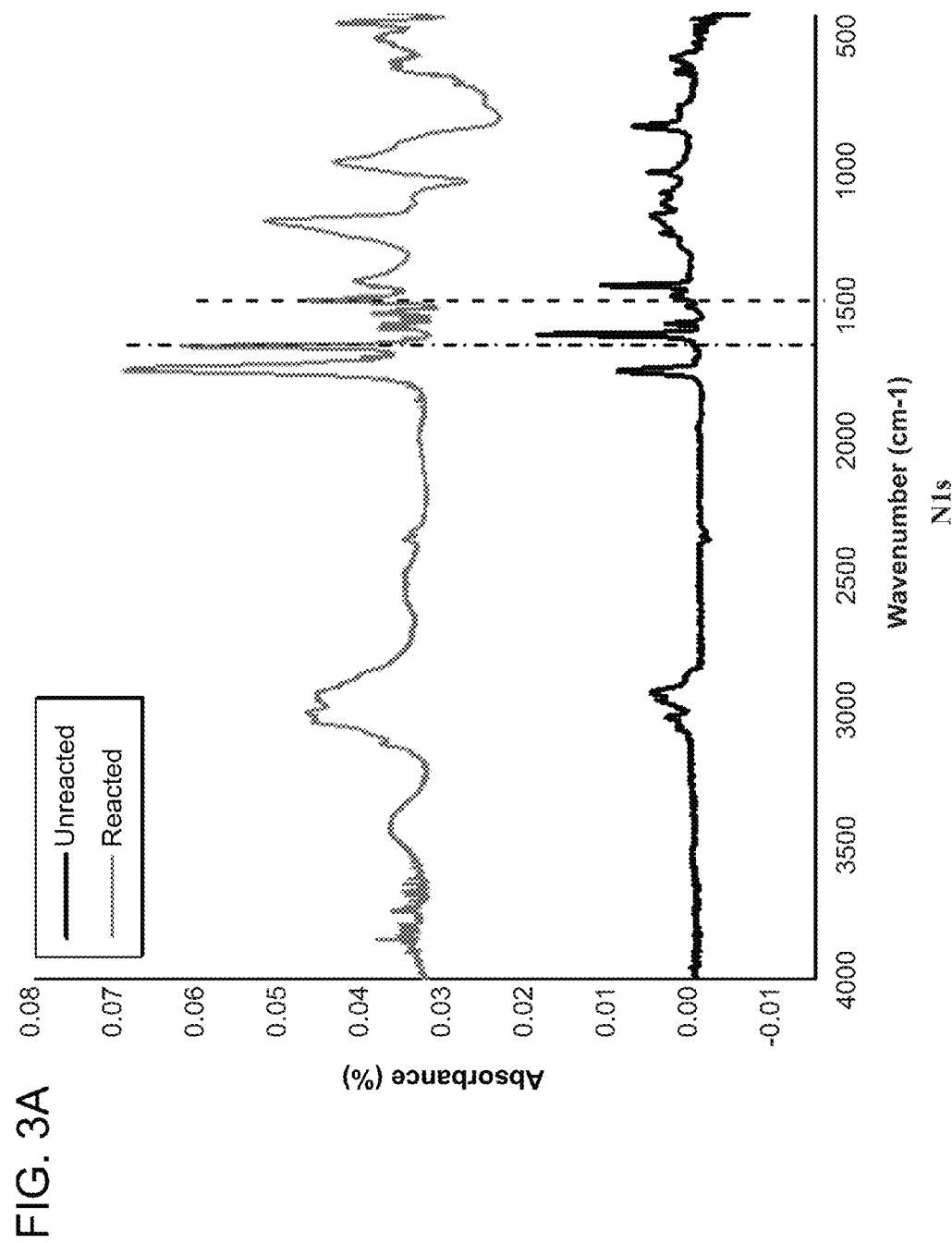
FIG. 3A depicts FTIR spectra of unreacted (as-deposited, bottom spectrum) and reacted (functionalized with 3-BPA) (top spectrum) copolymer film.

Post-deposition functionalization was performed by reacting the copolymer film with 3-BPA at 60° C. for 24 hours. During the functionalization the precursor tertiary nitrogen (reactant) in the pyridine was converted to quaternary nitrogen (product: pyridinium ion). High wave number shift of pyridine peak from 1597 $cm^{-1}$ to 1641 $cm^{-1}$ confirms the conversion of tertiary nitrogen in pyridine into quaternary nitrogen in the pyridinium ion. This higher frequency peak at 1632 $cm^{-1}$ is attributed to the ring stretching of pyridinium ions in the zwitterionic copolymer films. Appearance of new peak (present only in the reacted copolymer) at 1380 $cm^{-1}$ is due to $COO^-$ symmetric stretching. The formation of zwitterionic structure is witnessed by emergence of the peaks at 1641 $cm^{-1}$ and 1380 $cm^{-1}$ in the reacted copolymer films after the reaction with 3-BPA as shown in FIG. 3A.

Figure 3B:
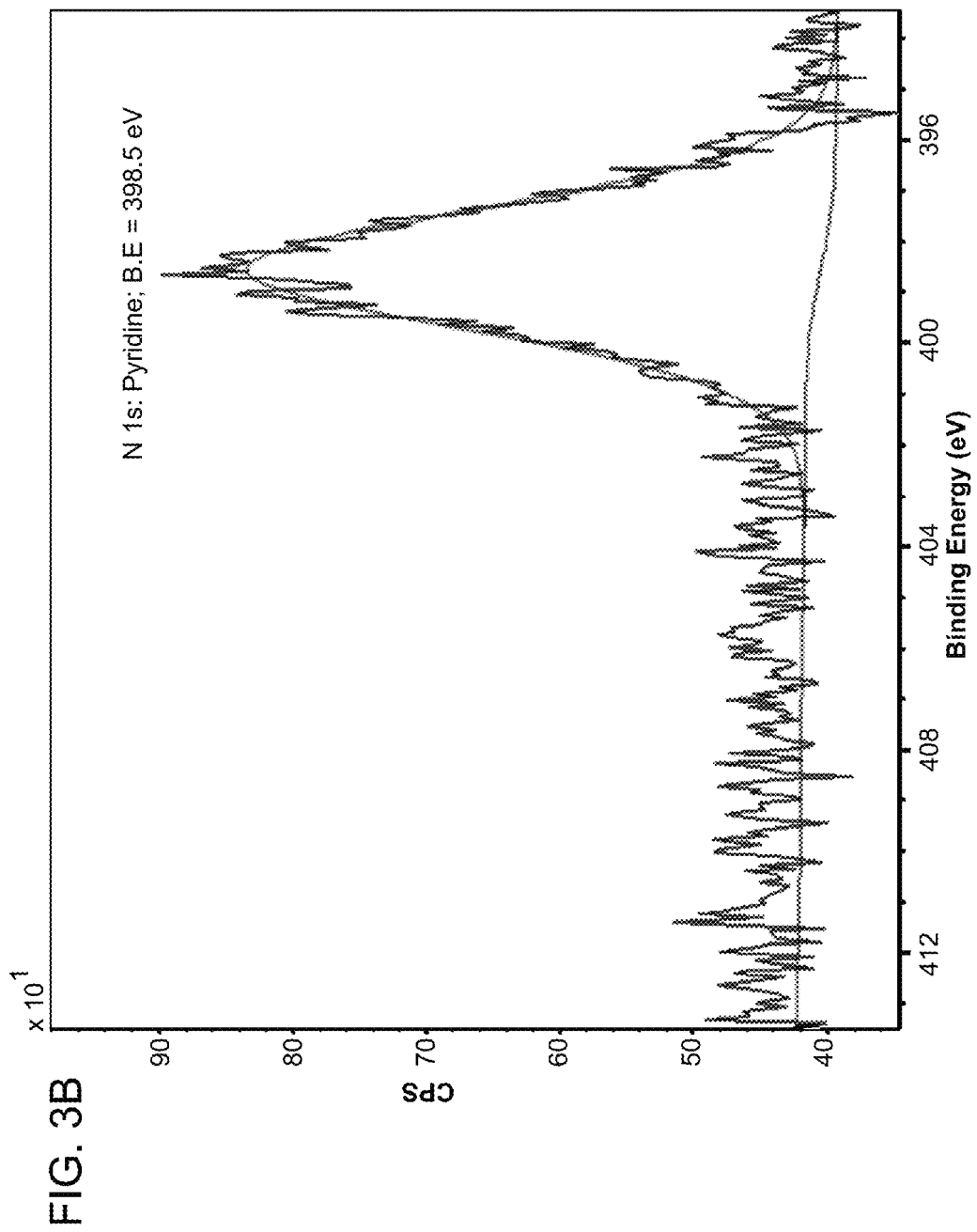
FIG. 3B depicts a N1s scan of unreacted copolymer film.
Figure 3C:
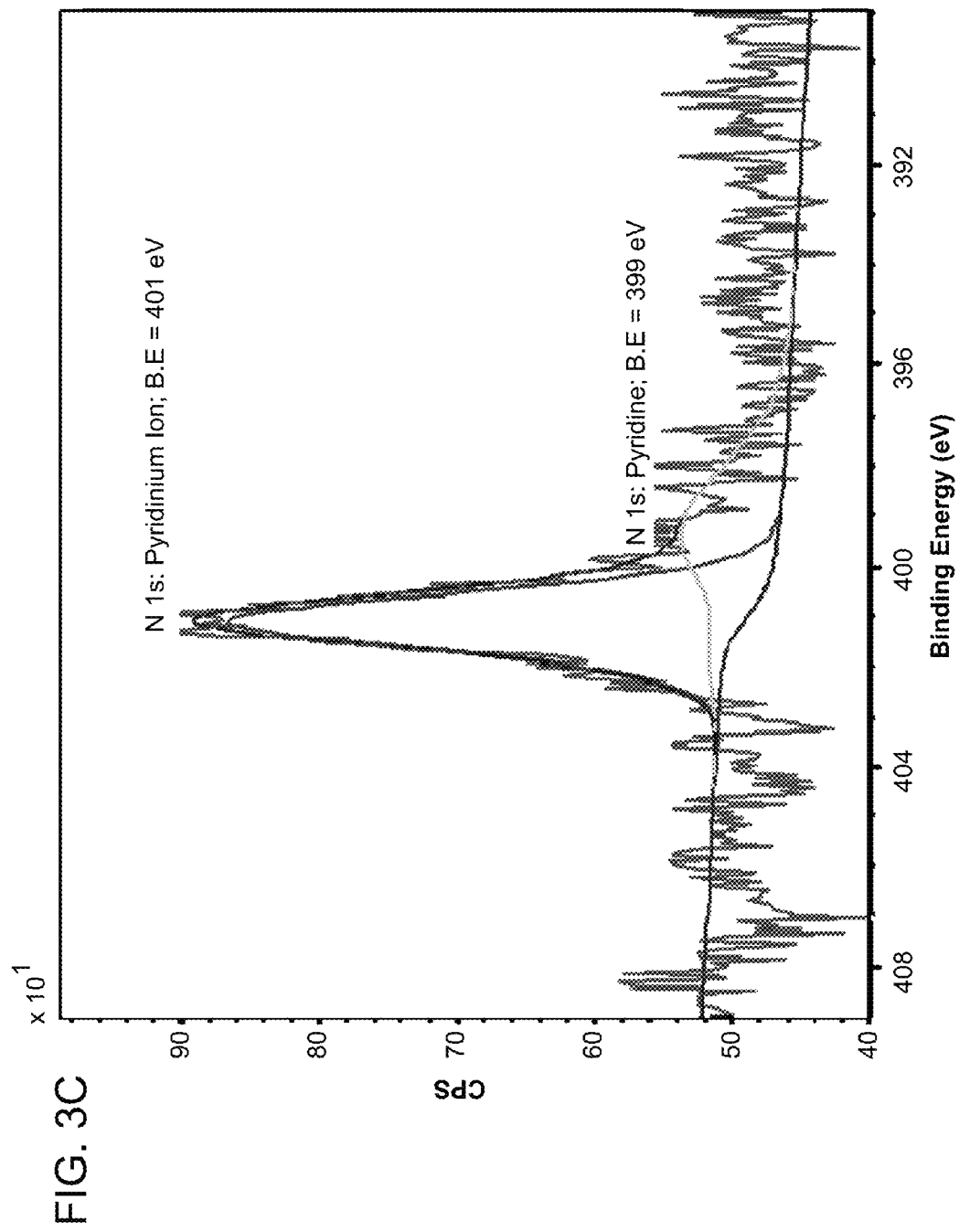
FIG. 3C depicts a N1s scan of copolymer film functionalized with 3-BPA.

The quaternizing reaction (pyridine to pyridinium ion formation) was confirmed by high resolution N1s XPS scan of reacted and un reacted p(4-VP-EGDA) films as depicted in FIG. 3B and FIG. 3C. Binding energy at 398.5 eV corresponds to the tertiary nitrogen in the pyridine, which is shifted to higher value of 400.1 eV which corresponds to quaternary nitrogen (pyridinium ion) as a result of reaction between the copolymer film and vapors of quaternizing agent (3-BPA). Both FTIR and XPS data confirmed the hypothesis that iCVD produced the zwitterionic copolymer poly (4-VP-co-EGDA), which contains the carboxybetaine units.

Example 3

Surface Hydrophilicity

Materials and Methods

Sessile drop contact angle was measured at ambient conditions (25° C. and 1 atm.) by utilizing goniometer equipped with an automatic dispenser (Model 500, Ramé-Hart). A 2-µL droplet of deionized water was placed on the specimen and contact angle was measured immediately after the contact. At least five measurements were performed on each specimen sufficiently apart from each other and the average was reported as the contact angle of the surface under study.

Results and Discussion

Contact angle measurement is a well-established method of measuring the hydrophilicity of a surface. Hydrophilicity is characterized by lower values of water contact angle. Lower values of contact angle are also indicative of higher wettability which helps in the formation of surface water layer. It is hypothesized that the non-fouling ability of both polyhydrophilic and polyzwitterionic materials are tightly correlated with a hydration layer near the surface. This surface water layer has also been reported to inhibit and/or discourage the attachment of bacteria on the surfaces immersed in water. Stability of deposited copolymer films were tested in DI water. For this purpose, modified membranes with different chemistries of as-deposited copolymer films and bare membranes were immersed in DI water for 24 hours and static contact angles before and after soaking were measured as represented in Table 2. It was found that water contact angle of the copolymer film with the least EGDA (15%) contents remains almost same as before soaking in DI water, indicating the excellent stability of deposited copolymer film in DI water. Whereas copolymer films with higher EGDA contents and bare membranes showed increased value of contact angles after soaking. This increase in contact angle is attributed to increased surface roughness after soaking: had there been any delamination of the coating, there would have been sudden drop in the contact angle; hence all the copolymer films represent stability of the deposited films in DI water.

TABLE 2

Effect of soaking of coated and bare membrane in DI water for 24 h.

| Specimen | Contact Angle before soaking in DI | | Contact Angle after soaking in DI | |
| --- | --- | --- | --- | --- |
| | Range | Average | Range | Average |
| Copolymer 1 | 25-32 | 29 | 26-34 | 29.9 |
| Copolymer 2 | 36.6-47.3 | 41.6 | 33-57 | 39.8 |
| Copolymer 3 | 37-46.5 | 42.9 | 39-58.5 | 47.8 |
| Bare Membrane | 55-63 | 60.4 | 57-68 | 66.5 |

Figure 4:
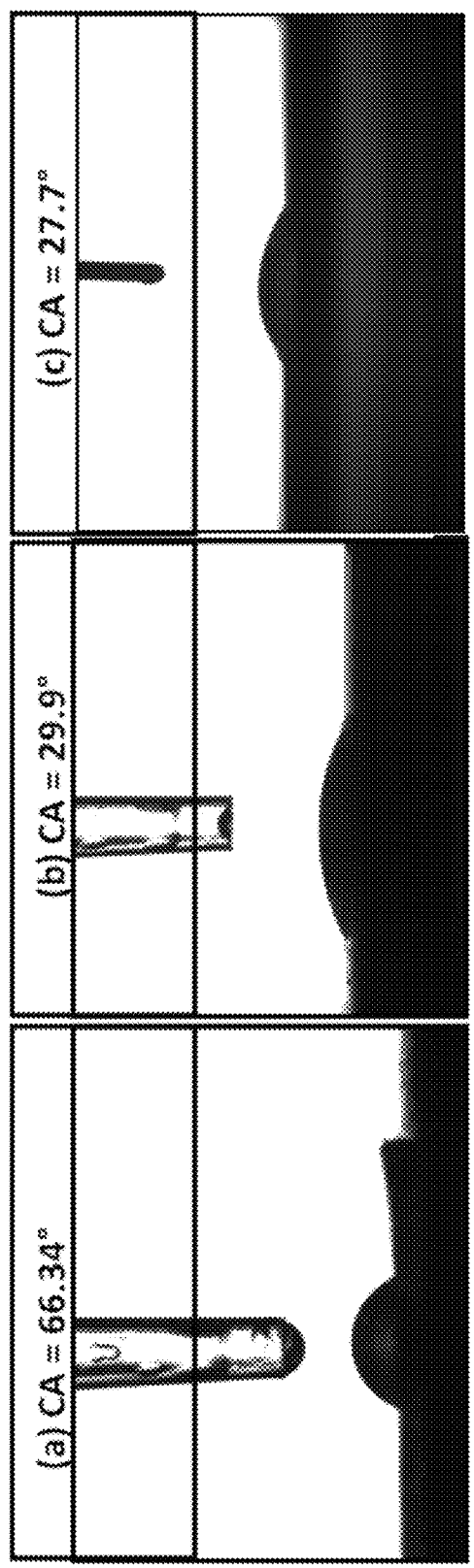
FIG. 4 depicts the average contact angles of (a) uncoated membrane (i.e., untreated membrane, bare membrane, virgin membrane, or commercial membrane); (b) membrane coated with co-polymer poly(4-VP-co-15% EGDA) film; and (c) contact angle of membrane coated with co-polymer poly(4-VP-co-15% EGDA) after six months of shelf life.
Figure 5A:
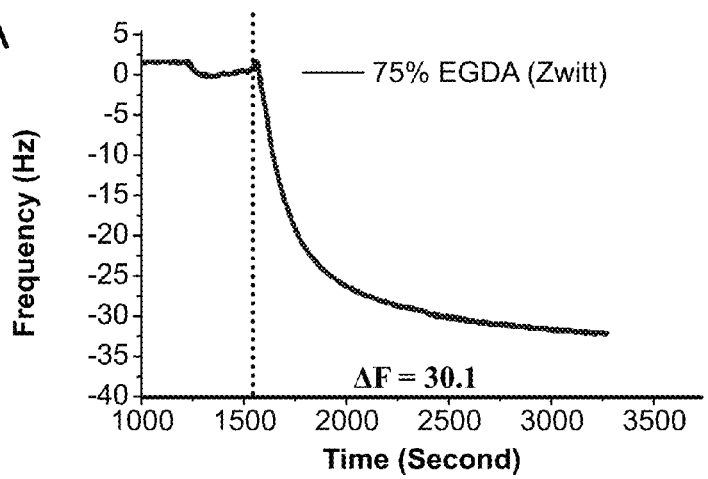
FIG. 5A depicts QCM-D frequency data revealing the effect of a zwitterionic co-polymer (75% EGDA) on protein (BSA) adsorption on $SiO_2$ sensors. Dotted lines indicate the time when the BSA solution was charged (~1500-1900 seconds).
Figure 5B:
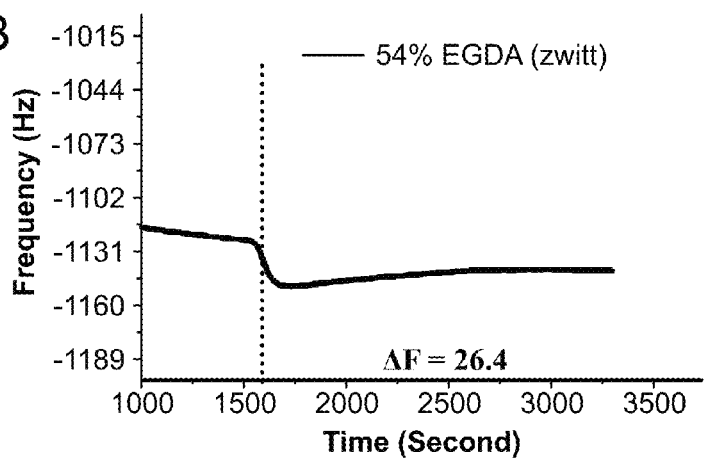
FIG. 5B depicts QCM-D frequency data revealing the effect of a zwitterionic co-polymer (54% EGDA) on protein (BSA) adsorption on $SiO_2$ sensors. Dotted lines indicate the time when the BSA solution was charged (~1500-1900 seconds).
Figure 5C:
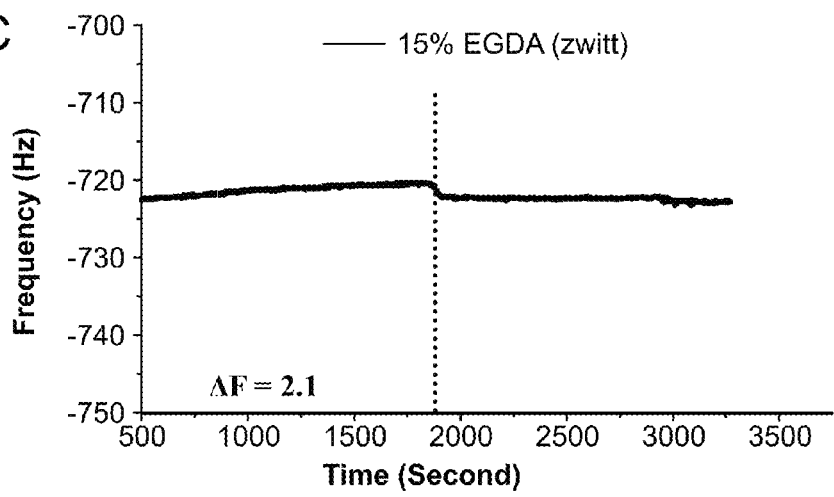
FIG. 5C depicts QCM-D frequency data revealing the effect of a zwitterionic co-polymer (15% EGDA) on protein (BSA) adsorption on $SiO_2$ sensors. Dotted lines indicate the time when the BSA solution was charged (~1500-1900 seconds).
Figure 5D:
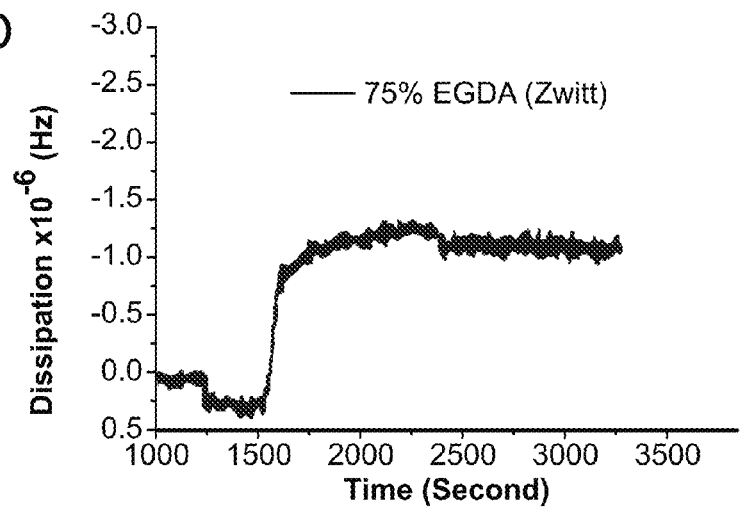
FIG. 5D depicts QCM-D dissipation data revealing the effect of a zwitterionic co-polymer (75% EGDA) on protein (BSA) adsorption on $SiO_2$ sensors.
Figure 5E:
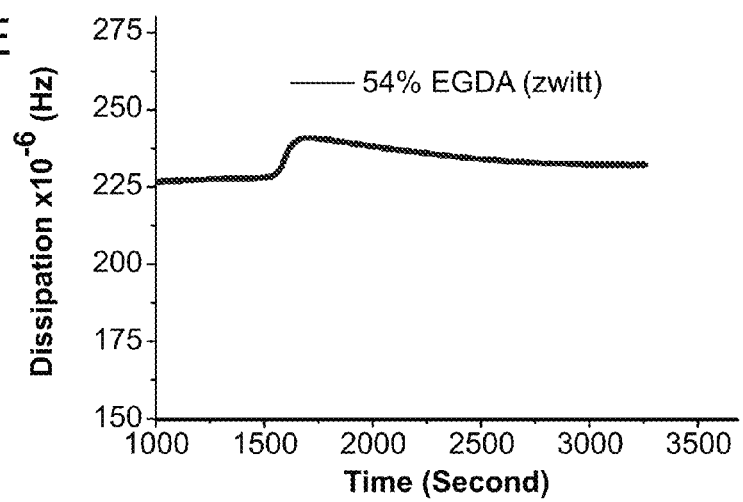
FIG. 5E depicts QCM-D dissipation data revealing the effect of a zwitterionic co-polymer (54% EGDA) on protein (BSA) adsorption on SiO$_2$ sensors.
Figure 5F:
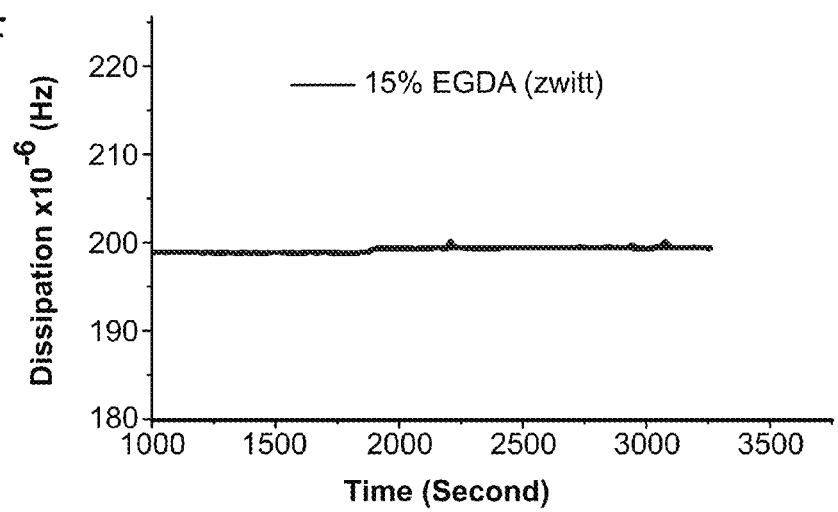
FIG. 5F depicts QCM-D dissipation data revealing the effect of a zwitterionic co-polymer (15% EGDA) on protein (BSA) adsorption on SiO$_2$ sensors.
Figure 5G:
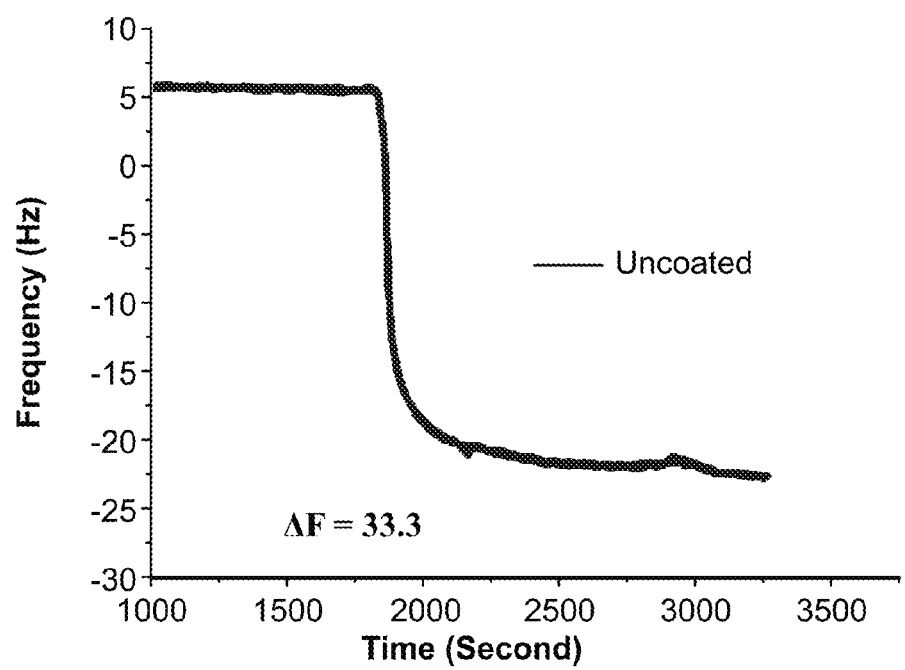
FIG. 5G depicts QCM-D frequency data revealing BSA adsorption on an uncoated sensor for reference.
Figure 5H:
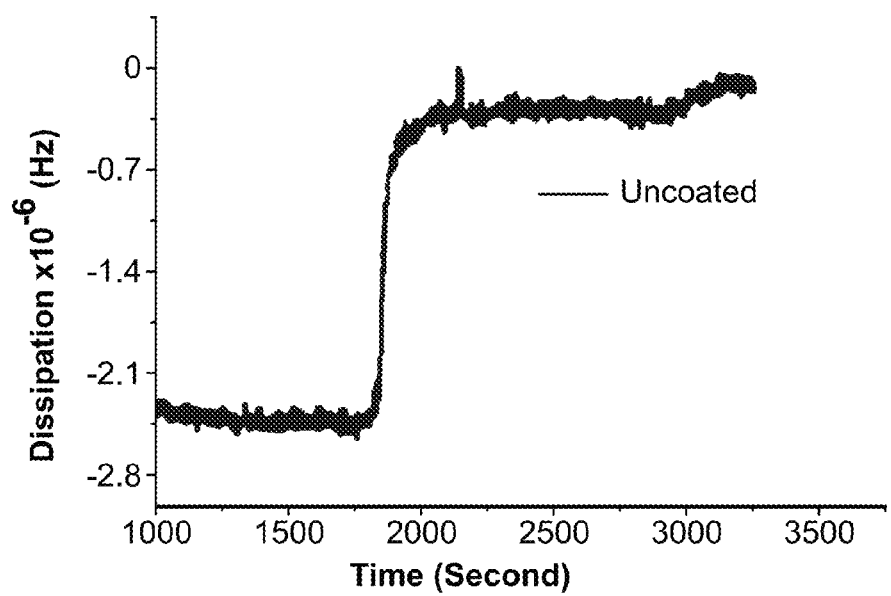
FIG. 5H depicts QCM-D dissipation data revealing BSA adsorption on an uncoated sensor for reference.

FIG. 4 represents water contact angle of modified and bare membranes. It is worth mentioning that the copolymer 1 (with 15% EGDA, Table 1) showing the lowest contact angle (the highest hydrophilicity) with very stable contact angle is another indication of much lower increase in surface roughness after the soaking as compared to other copolymer chemistries. Contact angles of copolymer 1 were measured to be 29.9° and were repeated after 6 months of shelf life and found to be 27.7° (FIG. 4(c)), the small difference of 2.2° is still in the experimental error range and is another representation of the stability of deposited iCVD coatings.

Water contact angle of the same copolymer chemistry (copolymer 1) deposited on Si substrates were also measured before and after the functionalization (zwitterion formation) with 3-BPA. It was found that water contact angle was greatly reduced from 55.8° to 39.7° after functionalization of as-deposited copolymer film with 3-BPA. This sharp reduction in contact angle after the functionalization is attributed to higher surface zwitterionic contents in this copolymer film; since it has the highest amount of precursor moieties (4-VP) which result in the formation of zwitterions after reaction with the quaternizing agent. As mentioned earlier, these higher surface zwitterionic contents help maintaining strong surface hydration layer and are highly desirable for ultra-low fouling properties of RO membranes.

Example 4

Surface Roughness

Materials and Methods

Surface roughness was determined by using MFP-3D (model: 805-696-6466 by ASYLUM Research) in tapping mode to avoid any damage of membrane samples by AFM tip. Dry membrane samples of dimensions 1 cm×1 cm were mounted perfectly flat on a glass slide using double-sided tape. For better accuracy and precision, measurements were performed at different locations and for variable scan areas. At least three images of each sample were taken by scanning 10×10 µm$^2$ and 20×20 µm$^2$ area sufficiently apart from each other in tapping mode utilizing tips with spring constant 0.5-4.5 N/m and fundamental frequency 315-366 kHz from (OTESPA from Bruker) and average surface roughness was reported in terms of root mean square (RMS).

Results and Discussion

Surface charge (neutral surface), higher surface hydrophilicity, and lower surface roughness are the three major parameters responsible for enhanced fouling resistance of RO membranes virtually in all environments. Several researchers have investigated the surface properties of different commercial membranes from the same manufacturer and from different manufacturers and found that the different morphological properties of the RO membranes are mainly the result of differences in the synthesis conditions: 1) using different monomer types, and 2) subjecting the membrane to post-fabrication treatments, such as coating the membrane with an alcohol rich aliphatic polymer. Furthermore, higher surface roughness will lead to the following: (i) uneven boundary layer or flow distribution over the coated surface, (ii) increased probability of pinhole-type defect formation, and (iii) more binding sites for attachment, in addition to shielding the attached cells from the hydraulic shear force leading to fouling.

Figure 10:
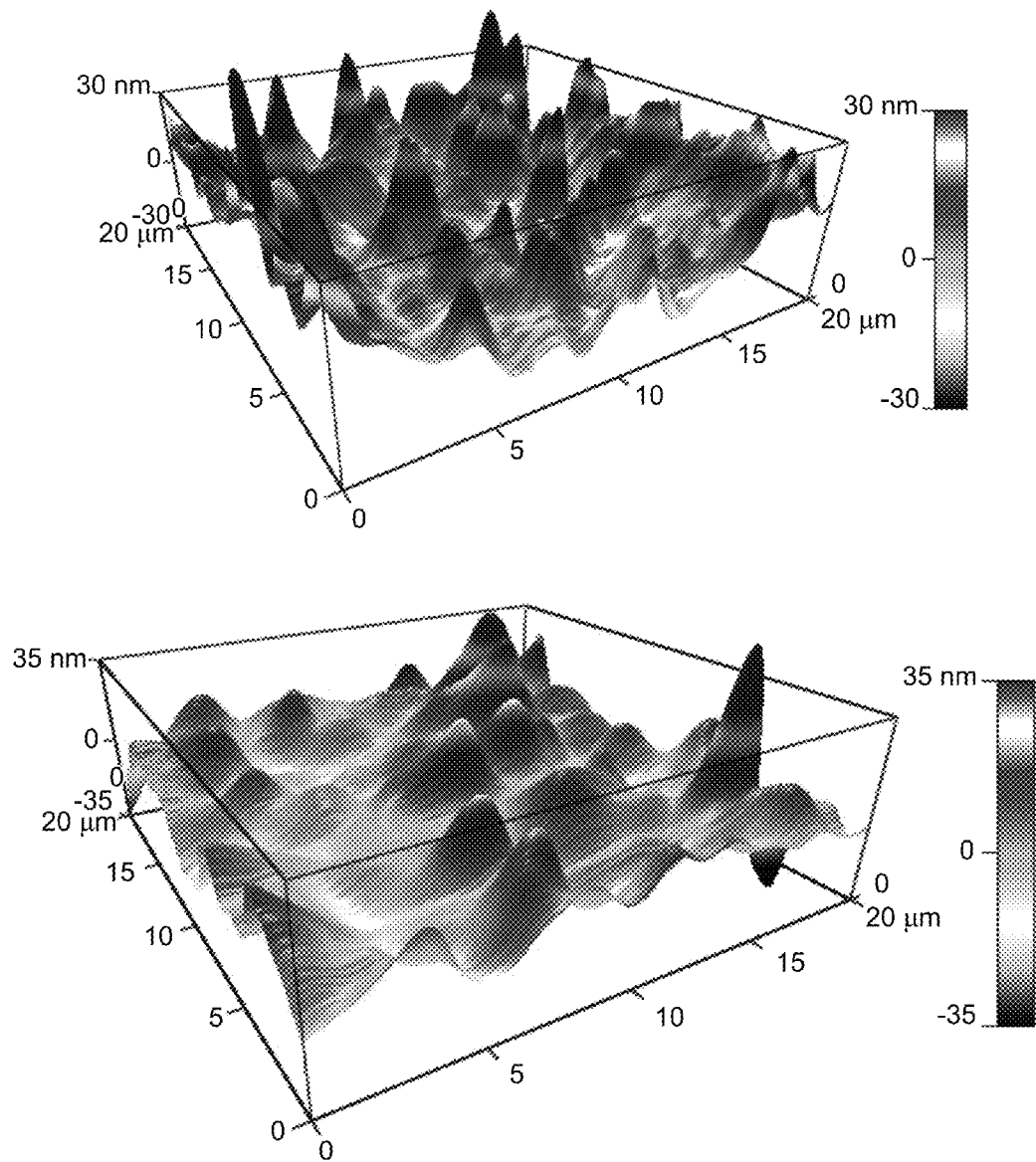
FIG. 10 depicts AFM images of (top) bare membrane (RMS=12.181) and (bottom) membrane modified with 30 nm copolymer 4-VP-EGDA film (RMS=7.100).

After deposition of the 4-VP-15% EGDA copolymer film (FIG. 10), surface roughness (RMS) was reduced. RMS roughness of 12.18 nm and 7.10 nm were found for virgin membrane and membrane modified with 4-VP-EGDA copolymer, respectively. This reduction in RMS roughness is attributed to the unique nature of iCVD that ensures deposition of very conformal and uniform thickness coating of the antifouling layer.

Example 5

Fouling Resistance

Materials and Methods

Biopolymer adsorption of different chemistries of zwitterionic coatings in a model foulant-bovine serum albumin (BSA) was investigated using QCM-D (Model E4, Q-sense). BSA which represents protein was dissolved in phosphate buffer saline (PBS) and solution concentration of 1 mg/mL was used for all the three foulants in all test runs. SiO$_2$ sensors with a fundamental frequency of 5 MHz (QSX-303, Q-sense) were used as iCVD coating substrates. Functionalized (zwitterionic), and bare (reference) sensors were placed in flow cells and allowed to equilibrate for at least 20 minutes at 25° C. by flowing PBS at flow rate of 100 µL/min. After achieving the stabilized flow, the solution was promptly changed to BSA in PBS and the frequency shift was monitored. Adsorbed mass of foulant (BSA) was calculated by using Saurbrey relation, for the frequency shift in third and fifth harmonic. The average of the $\Delta m_3$ and $\Delta m_5$ (masses calculated from $3^{rd}$ and $5^{th}$ harmonics respectively) was reported as the foulant mass adsorbed.

Results and Discussion

Fouling propensity of the 3 different compositions of copolymer coatings in a model foulant (BSA) was investigated using quartz crystal monitoring with dissipation (QCM-D) measurements. For this purpose, adsorption of BSA on three different chemistries of copolymer coated and functionalized quartz sensors (QSX-303) were monitored by measuring the frequency shift ($\Delta F$ in Hz) when BSA solution was charged into QCM-D flow cells. In order to find the optimized chemistry, all the copolymer coatings (copolymer 1, copolymer 2 and copolymer 3 in table 1) were tested to check their adsorption behavior in BSA solution under same condition. FIG. 5(A-F) represent the QCM-D data obtained when 1 mg/mt BSA solution was flown over the three zwitterionic copolymer coatings with different chemistries at constant temperature (25° C.). The mass adsorption of BSA was quantified by using Sauerbrey relationship; giving a liner relationship between mass change and frequency shift.

$$\Delta m = -C \frac{\Delta F}{n},$$

where $\Delta m$ is the mass changed (ng/cm$^2$), C is crystal-specific constant (17.7 ng. sec. cm$^{-2}$), n is the overtone and $\Delta F$ is the frequency shift as result of mass absorbed/adsorbed. In order for this to be valid, the adsorbed mass must be evenly distributed, must not slip over the surface, and must be sufficiently rigid (so that it forms a very thin film), and must offer negligible internal resistance. The dissipation changes correlate with the viscoelasticity of the film formed by the adsorbed mass. Very small dissipation change (particularly in the zwitterionic coating (copolymer 1): ~1×10$^{-6}$ Hz) imply that the BSA is surface adsorbed as opposed to absorbed. For the same zwitterionic coating (copolymer 1) mass changed was calculated to be ~9.5 ng cm$^{-2}$ (which corresponds to a frequency change of ~2.1 Hz), Much lower adsorption of BSA onto copolymer 1 (9.5 ng·cm$^{-2}$ as compared to 74.41 ng·cm$^{-2}$, 80.70 ng·cm$^{-2}$ and 106.25 ng·cm$^{-2}$ for the sensors coated with copolymer 2, copolymer 3 and bare sensor respectively) indicate the excellent antifouling properties of this zwitterionic chemistry (p(4-VP-15% EGDA)). Higher zwitterionic contents help form a hydration layer (due to higher electrostatic interaction with ambient water), which helps in reducing the fouling of the surfaces.

Significantly reduced adsorption of BSA on the zwitterionic copolymer coating p(4-VP-15% EGDA) as compared to other zwitterionic coatings (with higher EGDA contents: 54% & 75%) is attributed to higher amount of 4-VP in this chemistry. As mentioned earlier, nitrogen in the 4-VP is the precursor for the quaternizing reaction, which yields high surface zwitterionic content when treated with 3-BPA. Therefore, surface zwitterionic groups are responsible for the enhanced fouling resistance, which are produced by a diffusion-limited gas phase reaction at the surface. It is important to mention here that 15% EGDA in the copolymer film was enough to render the copolymer film water insoluble and to yield the high surface zwitterionic content, thereby resulting in enhanced fouling resistance. On the other hand, copolymer chemistries (with 54 and 75% EGDA) contain lower fraction of precursor 4-VP moieties, which result modified films having a reduced relative quantity of surface zwitterionic moieties and hence enhanced mass adsorption of biopolymer (BSA).

Example 6

Static Bacterial Adhesion Test

Materials and Methods

Resistance to bacterial adhesion in static environment was tested in nutrient broth (NB) (by Scharlau, Barcelona, Spain) utilizing a non-pathogenic strain of *Escherichia coli* (*E. coli*, K12 wild-type MG 1655). Appropriate amount of NB was dissolved in DI water at room temperature following the manufacturer's instructions. NB solution was autoclaved at 121° C. and 1.12 bars for 3 hours. *E. coli* cells were then inoculated in the cooled NB solution and cultured overnight at 37° C. in the Trypton media until reached mid exponential phase. Aliquots of pre-culture were inoculated in the fresh medium and incubated under the same condition until reach to an absorbance of 0.41 at 600 nm which corresponds to ~4.1×10$^8$ CFU/mL. About 30 mL of the bacterial solution was then transferred to test tubes (TTs).

Duplicate samples of approximately 1×1 cm$^2$ areas of bare and modified membranes were immersed in the TTs (making sure that each membrane coupon is completely exposed to bacterial suspension), isolated from air and exposed in bacterial strain for 2 hrs. Exposed samples were gently rinsed with fresh NB (without bacteria) to remove any loosely adhered bacteria, air dried in enclosed petri dishes. The membrane coupons were fixed on to specimen stage with double sided copper tape, sputter coated for 5 minutes, and were then observed under SEM (JEOL, JSM, 6460LV, Japan). For quantification of attached bacteria, 0.0133 mm$^2$ area of each sample was observed at relatively smaller magnification (3000×) and at least 25 images were taken at locations sufficiently apart on duplicate samples and attached bacteria counted manually.

Results and Discussion

Commercial RO membranes are prone to fouling (organic, inorganic and microbial: biofouling), which results in their reduced efficiency and increased chemical cleaning schedule. Both of these factors result in loss of production and quality of final product (which is clean water), however, the most serious concern for RO plants is biofouling. Large RO plants report enormous economic losses in the range of millions of dollars.

Figure 6:
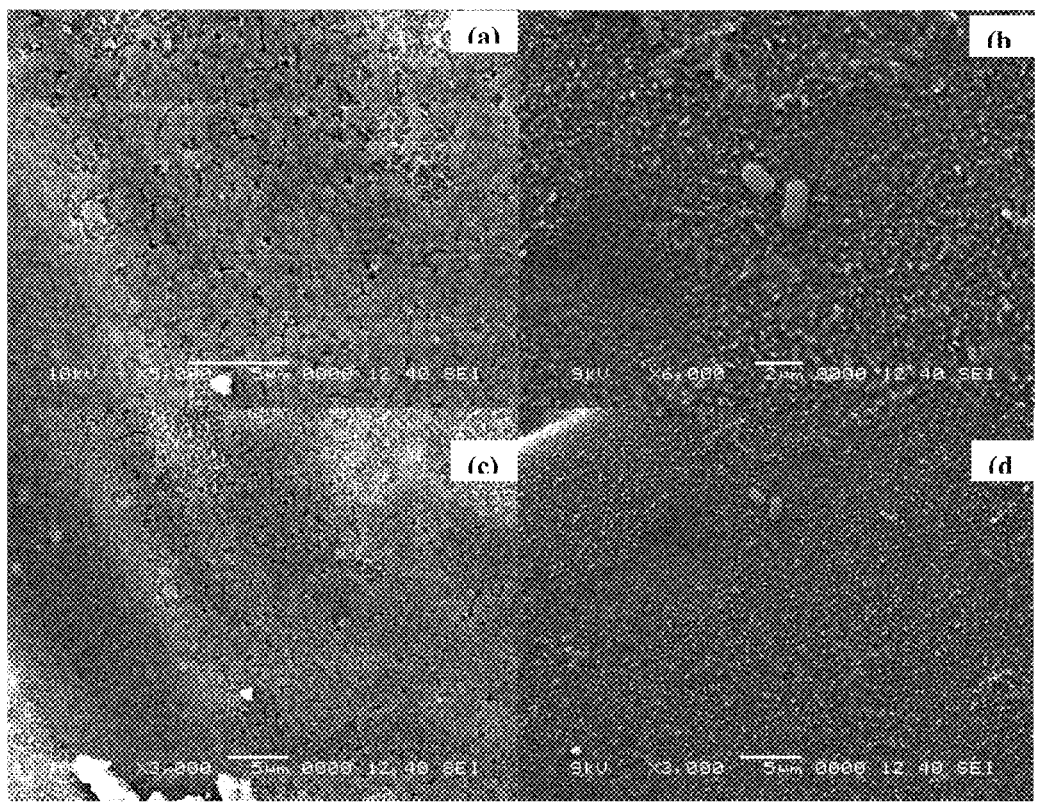
FIG. 6 depicts SEM images of (a and c) bare membrane showing enormous bacterial colonies and (b and d) coated and functionalized membranes taken at 5000× and 3000× magnification respectively.

After the determination of the optimum film chemistry with regards to biopolymer (BSA) adsorption, the next step was to compare and contrast the bacterial adhesion between the commercial membrane and the membrane modified with the optimized composition. For this purpose, resistance to bacterial adhesion of modified and bare membranes under the static environment was investigated by exposing the membrane coupons in *E. coli* as bacterial strain. Attached bacteria were analyzed (both qualitatively and quantitatively) by taking SEM images. FIG. 6(*a* and *c*), show attached bacteria on virgin membrane whereas FIG. 6(*b* and *d*), show the attached bacteria on membranes modified with optimized copolymer coating (p(4-VP-co-15% EGDA)) and functionalized with 3-BPA for 24 h. Several colonies of bacteria were observed on the bare membranes, but no such colony was observed on the modified membranes, clearly demonstrating the superior performance against bacterial adhesion.

Quantification of attached bacteria was performed on SEM images taken at relatively smaller magnification (3000×) in order to have as much area observed as possible in SEM images, yet enabling the easy identification of attached cells. 0.0133 mm$^2$ areas was observed by each SEM image and 25 SEM images were taken on two replicate membrane coupons for both bare and modified membranes at locations sufficiently apart from each other to cover more area and thus more distribution of attached bacterial cells.

Figure 7:
FIG. 7 depicts the number of E. coli cells attached to the unit membrane surface (per mm$^2$) (bare membrane=left bar; coated and functionalized membrane=right bar). Membrane samples were immersed in NB for 2 h at room temperature in air isolated TTs containing ~4.1×10$^8$ Cell/mL.

Quantification was done on 5, 10, 15, 20 and 25 SEM images following the method used by A. Matin et al. (*Separation and Purification Technology* 124 (2014) 117-123) with minor modification. The average number of attached bacteria was normalized to the area observed in each SEM image (0.0133 mm²) and drawn as bar chart (FIG. 7). It is obvious from FIG. 7 that bare membranes are very prone to biofouling with much higher bacterial attachment approximately 8500 cell/mm² as compared to the modified membranes which show only less than 200 cells per unit area. This corresponds to a ~97% reduction in the attached bacterial cells. The SEM images also reveal the marked distribution of attached cells: colonies of enormous bacteria can be identified on bare membrane (FIG. 6 (*a,c*)), whereas, only few of individual cells (if any) can be seen on the modified membranes. These results show the effectiveness of the coated membrane and reveal the excellent performance of modified membranes in bacterial environment.

Example 7

Performance Evaluation (Permeation Tests)

Materials and Methods

Performance evaluation (permeate flux and salt rejection) tests were performed on a permeation trolley equipped with permeation cell from STRELITECH, Corp. (CF 042) with active area ~42 cm² and 20 liters feed water tank. Membranes were placed in the cell with coated side down and were compacted from 18-20 hours at 300 Psi in DI water before taking any measurement. DI water was pumped from feed tank via Hydra Cell pump (Model no. M03SASGSSCA, MN, USA) and was recirculated to feed in order to maintain the concentration of feed. Temperature of feed water was maintained at 21° C.±1° C. by chiller (from Polystat, Cole Parmer, USA) attached to the permeation setup. Permeate volume was collected for five minutes in a measuring flask (100 mL) and was converted to flux in L/m² h. Three readings were taken after every hour and average reported as the permeate flux of membrane under test. Appropriate amount of sodium chloride (NaCl) was thoroughly mixed in 1 liter DI water and then added to the feed tank to make 2000 mg/L salt concentration of feed solution. After stabilization of 45 minutes, permeate volume was collected for 5 minutes, measurements were repeated three times every hour, and average of three readings reported as the average flux after salt addition. Percentage salt rejection was measured using the following equation:

%R=(CF−CP)/CF where, CF and CP are the concentration of salt in feed and permeate respectively, with the later measured with conductivity meter (YSI-3200, Conductivity instruments, Yellow Spring, Ohio, USA) equipped with conductivity cell for YSI-3200 instrument and type 3253.

Results and Discussion

Figure 8:
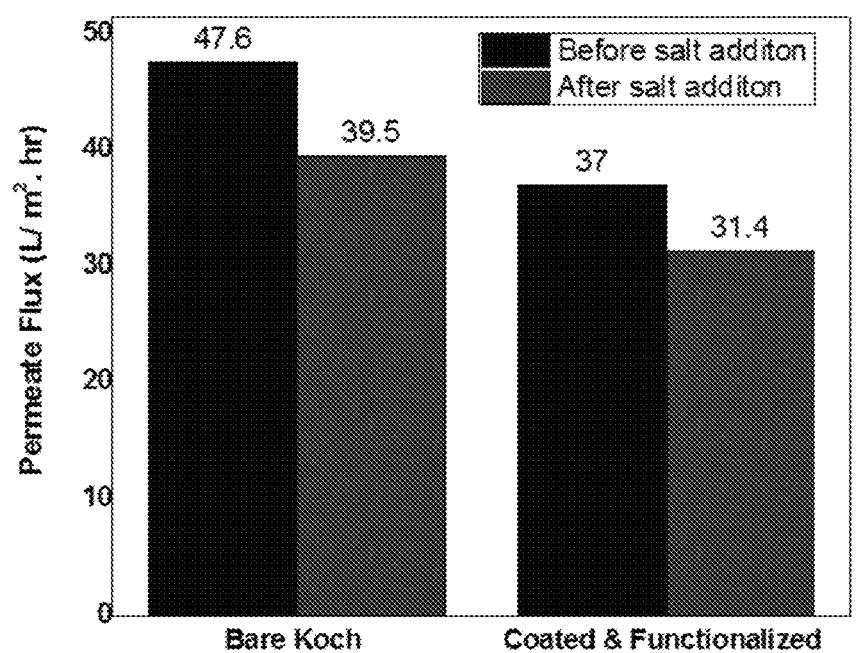
FIG. 8 depicts permeate water flux on bare and modified (with 38 nm (±3 nm) thick coating of poly(4-VP-co-15% EGDA)) membranes. Flux was calculated at 300 psi and 21° C. using active membrane areas of ~42 cm$^2$ (before salt addition=left bar; after salt addition=right bar).
Figure 9:
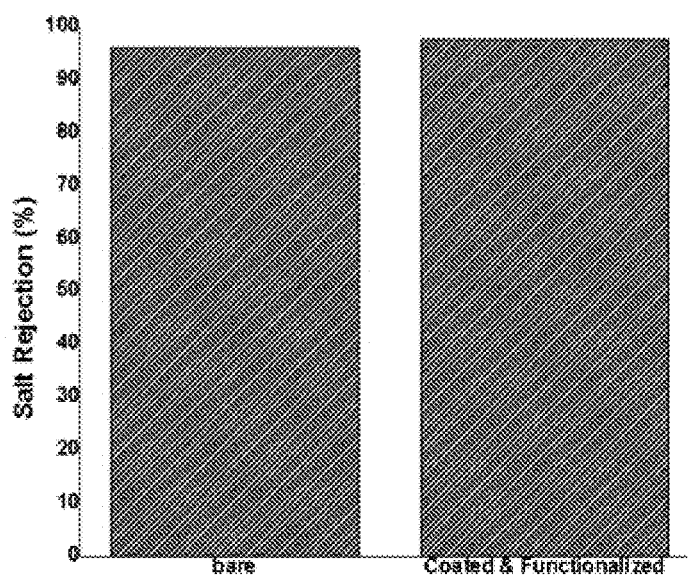
FIG. 9 depicts salt rejection (percentages) of bare (left bar) and modified with 38 nm (±3 nm) thick coating of poly(4-VP-co-15% EGDA)) (right bar) membranes.

FIG. 8 shows permeate flux of bare membranes and membranes modified with optimized chemistry before and after salt addition. Bare membranes showed permeate flux of 47.1 L/m² h, whereas modified membranes show 37.5 L/m² h as permeate water flux. FIG. 9, represents the salt rejection of bare and modified membranes after a test run of 4 h at 300 psi. Higher salt rejection (~98%) is observed for modified as compared to bare membranes (96%).

Table 3 summarizes the performance evaluation (permeate flux and salt rejection) of modified and bare membranes.

TABLE 3

Permeation test results: permeate water flux and percentage salt rejection

| Sample | Permeate Flux [L/m² h] | Permeate Flux after salt addition [L/m² h] | Salt rejection (%) |
| --- | --- | --- | --- |
| Bare Membrane | 47.1 | 39.5 | 96.0 |
| Coated and Functionalized Membrane | 37.5 | 31.4 | 97.6 |

INCORPORATION BY REFERENCE

All of the U.S. patents and U.S. patent application publications cited herein are hereby incorporated by reference.

EQUIVALENTS

Those skilled in the art will recognize, or be able to ascertain using no more than routine experimentation, many equivalents to the specific embodiments of the invention described herein. Such equivalents are intended to be encompassed by the following claims.

We claim:

1. A composition, wherein the composition comprises a porous substrate and a coating material, wherein
the coating material comprises a polymer comprising a plurality of first repeat units and a plurality of second repeat units,
wherein
the first repeat unit is

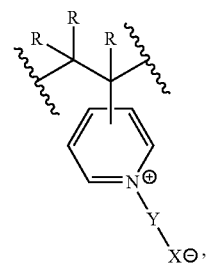

wherein, independently for each occurrence,
R is H, alkyl, halo, hydroxy, amino, nitro, or cyano;
Y is a linker that does not comprise an amide bond, an ester bond, or an ether bond; and
$X^{\ominus}$ is $—SO_3^{\ominus}$ or $—COO^{\ominus}$;
the second repeat unit is

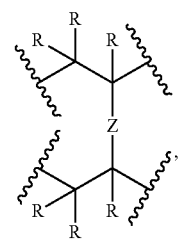

wherein, independently for each occurrence,
R is H, alkyl, halo, hydroxy, amino, nitro, or cyano;
Z is

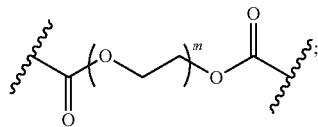

and
m is 1-10, inclusive.

2. The composition of claim 1, wherein the substrate comprises a polysulfone, a polyimide, or a polyamide.

3. The composition of claim 1, wherein the substrate comprises a polyamide.

4. The composition of claim 1, wherein the substrate is a membrane.

5. The composition of claim 1, wherein the substrate is a reverse osmosis membrane.

6. The composition of claim 1, wherein the static contact angle is from about 20° to about 50° at about 25° C. and about 1 atm.

7. The composition of claim 1, wherein, upon exposure to a biomolecule, an area of the composition adsorbs less than about 80%, less than about 70%, less than about 60%, less than about 50%, less than about 40%, less than about 30%, less than about 20%, or less than about 10% by mass of the biomolecule, as compared to the mass of the biomolecule adsorbed by the same area of the substrate alone, without the coating material, under identical conditions.

8. The composition of claim 1, wherein, upon exposure to a quantity of an organism, an area of the composition adsorbs less than about 50%, less than about 40%, less than about 30%, less than about 20%, less than about 10%, less than about 5%, less than about 4%, less than about 3%, less than about 2%, or less than about 1% by number of the organism, as compared to the number of organisms adsorbed by the same area of the substrate alone, without the coating material, under identical conditions.

9. The composition of claim 1, wherein the permeability of the composition is about 50%, about 55%, about 60%, about 65%, about 70%, about 75%, about 80%, about 85%, about 90%, about 95%, or about 99% of the permeability of the substrate alone, without the coating material, under identical conditions.

10. The composition of claim 1, wherein, upon exposure to a feed solution comprising a quantity of salt, the composition rejects about 70%, about 75%, about 80%, about 85%, about 90%, about 91%, about 92%, about 93%, about 94%, about 95%, about 96%, about 97%, about 98%, or about 99% of the salt in the feed solution.

11. An article comprising a composition of claim 1, wherein the article is incorporated into a water desalination device.

12. A method for treating water comprising
passing an aqueous solution through an article comprising a composition of claim 9, wherein said aqueous solution comprises water and a first quantity of a substance, thereby producing a second aqueous solution;
the second aqueous solution comprises water and a second quantity of the substance; and the second quantity is substantially lower than first quantity.

13. The method of claim 12, wherein the substance is salt.

14. The composition of claim 1, wherein the polymer further comprises a plurality of third repeat units; and the third repeat unit is

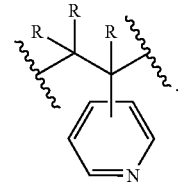

15. The composition of claim 14, wherein the number ratio of first repeat units to third repeat units is about 9:1.

16. The composition of claim 1, wherein R is H.

17. The composition of claim 1, wherein Y is alkylene.

18. The composition of claim 1, wherein Y is 1,2-ethylene.

19. The composition of claim 1, wherein X is —COO$^\ominus$.

20. The composition of claim 1, wherein m is 1.

* * * * *